United States Patent [19]

Jerome

[11] Patent Number: 5,248,577
[45] Date of Patent: Sep. 28, 1993

[54] REACTANT CONCENTRATION CONTROL METHOD AND APPARATUS FOR PRECIPITATION REACTIONS

[75] Inventor: Norman F. Jerome, Malta, Ill.

[73] Assignee: Eastman Kodak Company, Rochester, N.Y.

[21] Appl. No.: 566,286

[22] Filed: Aug. 13, 1990

[51] Int. Cl.$^5$ ............................................. G03C 1/015
[52] U.S. Cl. ..................................... 430/30; 430/569; 423/42; 423/46; 423/491; 23/295 R; 364/150; 364/164; 364/165; 364/500; 364/502; 422/110; 422/111
[58] Field of Search ................. 430/30, 569; 422/110, 422/111; 423/42, 46, 491; 23/295 R; 137/4, 8, 9, 486, 487.5; 364/164, 165, 150, 500, 502

[56] References Cited

U.S. PATENT DOCUMENTS

| | | | |
|---|---|---|---|
| 3,672,900 | 6/1972 | Kurz | 430/567 |
| 3,737,313 | 5/1973 | Rosecrants et al. | |
| 3,782,954 | 1/1974 | Porter et al. | 430/569 |
| 3,785,777 | 1/1974 | Porter et al. | |
| 3,821,002 | 6/1974 | Culhane et al. | 430/30 |
| 3,897,935 | 8/1975 | Forster et al. | |
| 3,999,048 | 12/1976 | Parthemore | 422/110 |
| 4,026,668 | 5/1977 | Culhane et al. | 422/110 |
| 4,031,912 | 6/1977 | Lu et al. | 137/5 |
| 4,171,224 | 10/1979 | Verhille et al. | 430/569 |
| 4,591,549 | 5/1986 | Matsuzaka et al. | 430/569 |
| 4,728,603 | 3/1988 | Yagi et al. | 430/569 |
| 4,905,160 | 2/1990 | Maurice et al. | 364/500 |
| 4,933,870 | 6/1990 | Chang | 364/497 |

FOREIGN PATENT DOCUMENTS

| | | |
|---|---|---|
| 0301579 | 6/1989 | European Pat. Off. |
| 41664 | 10/1971 | Japan |
| 197534 | 6/1982 | Japan |
| 186681 | 1/1984 | Japan |
| 186682 | 3/1984 | Japan |
| 186683 | 11/1984 | Japan |
| 186680 | 4/1986 | Japan |
| 289833 | 5/1987 | Japan |

OTHER PUBLICATIONS

James, T. H. "The Theory of the Photographic Process", 4th Edition pp. 5-6 (published 1977).

*Primary Examiner*—Marion E. McCamish
*Assistant Examiner*—Janis L. Dote
*Attorney, Agent, or Firm*—L. George Legg

[57] ABSTRACT

A method and an apparatus for controlling reactant ion concentration within a precipitation vessel to optimize the reactions occurring therein is disclosed. In one important implementation, the reactant controlled comprises halide ion in a reactor during the precipitation and growth of silver halide grains. In this embodiment, the method includes measuring the amount of halide ion within the precipitation vessel; measuring the flow rates of the halide feed stream and the silver feed stream; storing the measured halide ion concentration and measured feed stream flow rates; computing an estimated smoothed halide ion concentration value as a function of the stored measured halide ion concentration and measured feed stream flow rates; and adjustably controlling the amount of halide ion added to the precipitation vessel as a function of this estimated halide ion concentration value. Preferably, N most recent measured halide ion concentrations and measured halide and silver feed stream flow rates are stored and used in determining the estimated smoothed halide ion concentration. Mathematical algorithms are derived herein to facilitate the computation of the estimated halide ion concentration and the necessary flow rate adjustment. Analogous apparatus is also provided herein.

21 Claims, 10 Drawing Sheets

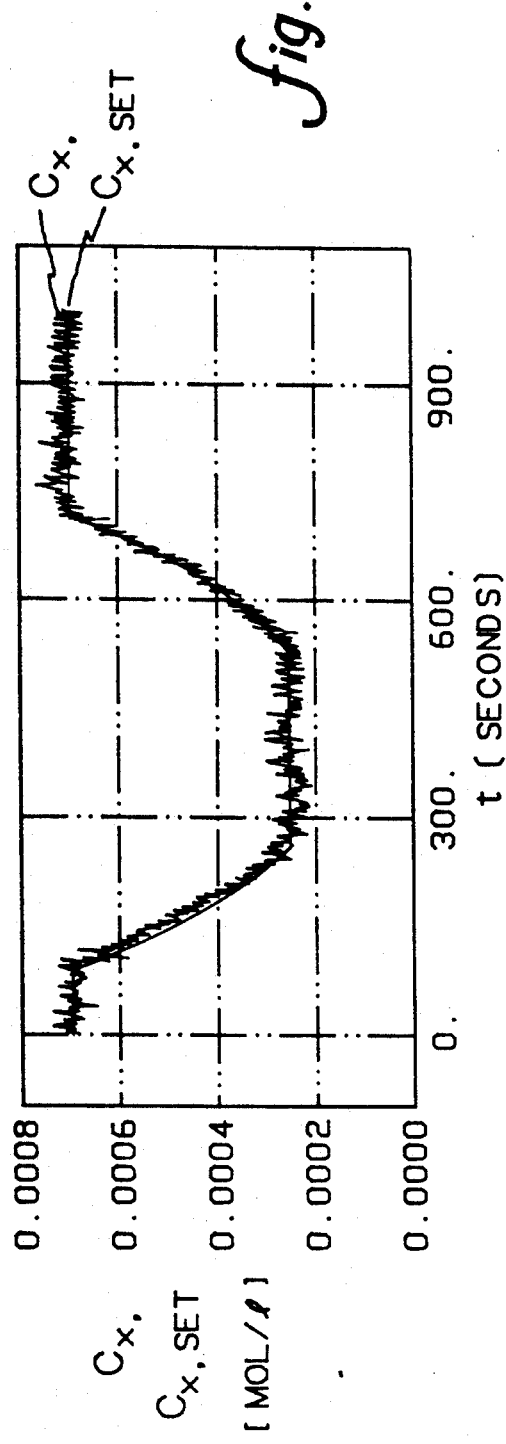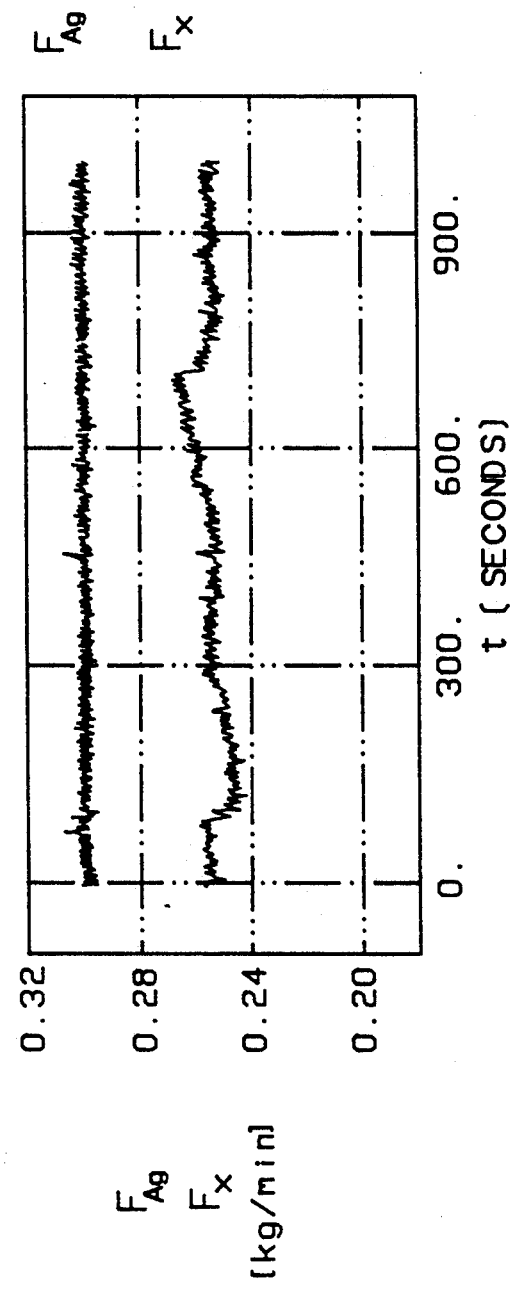

REACTANT CONCENTRATION CONTROL METHOD AND APPARATUS FOR PRECIPITATION REACTIONS

BACKGROUND OF THE INVENTION

1. Technical Field

The present invention relates to a method and an apparatus for controlling reactant ion concentration within a precipitation vessel to optimize the reactions occurring therein, and more particularly, the invention comprises such a method and apparatus for control of halide ion concentration in a reactor during the precipitation and growth of silver halide grains.

2. Description of the Prior Art

Precipitation and growth of silver halide (AgX) grains for use in photographic processing is generally carried out in a stirred tank reactor with two continuously flowing inlet streams: an aqueous silver nitrate stream, and an aqueous "salt" stream, which is typically a solution of one or more halide salts (for example, NaBr and NaI). In order to obtain the desired size distribution and morphology of AgX grains, it is necessary to control the concentration of excess halide ion during the precipitation and growth of the grains. In a conventional system, each reactant inlet stream is controlled by a delivery system which includes a flow controller that monitors the inlet stream flow rate, and if necessary, adjusts the flow pump to maintain the desired flow rate.

Typically, current practice is to infer the halide ion concentration within the reactor from the voltage measured at an electrochemical cell and silver electrode immersed within the reactor. This inferred halide ion concentration is then used to calculate the required adjustment to the current flow rate of the salt inlet stream. The method used for this calculation is a simple mass-balance relation and the process is repeated with a new voltage reading at regular intervals (e.g., at 5 second intervals). This practice suffers from two major flaws.

First, the voltage signal obtained from the silver electrode is quite noisy due to turbulent concentration variations in the local vicinity of the electrode. Since the variations are a fundamental property of the reactor, this noise cannot be eliminated. The undesired impact on the concentration-control method is that the current method can not distinguish fluctuations due to "noise" (and hence unavoidable) from fluctuations due to genuine shift in the mean halide concentration in the reactor (and hence requiring corrective change in the salt flow rate). This error often results in a rapid and excessive fluctuation in salt-feed flow rate, as the system attempts to control "noise." These excessive salt-feed fluctuations lead to nonuniformities in reactor conditions, which are believed to cause degradation in AgX grain size uniformity and morphology. The flow rate fluctuations also cause excessive wear on the salt feed delivery system.

The second major problem with the present control approach is with the method of calculating the required adjustment of salt feed flow rate[, i.e.,] given a value of the current halide ion concentration in the reactor. Currently, an equation is used that depends on having perfectly accurate values for the concentrations of both the salt and silver feed streams, as well their flow rates. In practice, however, the feed concentrations are only known to within approximately 0.5%, and the flow meter calibrations can be incorrect by a similar amount. These unavoidable errors prevent the current method from producing a correct adjustment for the salt feed flow rate and hence prevent the system from obtaining the desired halide concentration level in the reactor.

The present invention solves both of these current practice flaws.

SUMMARY OF THE INVENTION

Briefly summarized, in one aspect the invention comprises a method for controlling the concentration of one of the reactants in a precipitation vessel which is fed by a first reactant feed stream $B^-$, and a second feed stream containing a second reactant $C^+$. The first and second reactants precipitate in the reaction in a batch process having the form: $A^+ + B^- + C^+ + D^- \rightarrow C\text{-}B + A^+ + D^-$. The method controls the flow rate of the first feed stream to optimize the first reactant reactor concentration and thereby to optimize the precipitation reaction. The method comprises the steps of:

(a) measuring the flow rates of the first reactant feed stream and the second reactant feed stream;

(b) measuring the first reactant concentration within the precipitation reactor;

(c) storing the measured first and second feed stream flow rates and the measured first reactant reactor concentration;

(d) repeating steps (a), (b) and (c) for each of N periodically timed measurement samples;

(e) computing an estimated smoothed value for the first reactant reactor concentration as a function of the N stored measured first reactant concentrations, first reactant feed low rates, and second reactant feed flow rates; and (f) controlling the flow rate of the first reactant feed by computing a first reactant feed stream flow rate control signal using an adjustable control law of the form:

$$F_{1R} = F_{2R}\frac{((C_{2R,F} + \delta C_{2R}) + C_{1R,Set})}{(C_{1R,F} - C_{1R,Set})} + \frac{\text{vol}(t)(C_{1R,Set} - C_{1R,Est}(t))}{\delta t(C_{1R,F} - C_{1R,Set})}$$

wherein:

$F_{1R}$ = optimal flow rate of first reactant feed stream $F_{2R}$ = flow rate of second reactant feed stream $C_{2R,F}$ = concentration of second reactant feed stream $C_{1R,F}$ = concentration of first reactant feed stream $\delta C_{2R}$ = error in second reactant feed stream concentration from nominal value $C_{1R,Set}$ = set point concentration for first reactant $C_{1R,Est}(t)$ = estimated smoothed value for the first reactant reactor concentration at time t vol(t) = reactor liquid volume at time t $\delta t$ = sample time interval of interest. within the precipitation vessel as a function of N stored measured first reactant concentrations, first reactant feed stream flow rates, and second reactant feed stream flow rates. For the sake of uniformity in describing the method of the invention, the reactant for which both the concentration in the vessel and the flow rate into the vessel are inputs into the calculations will be called the "first" reactant; the reactant for which only the flow rate is an input will be called the "second"

reactant. Thus, in a reaction between silver ion and halide ion, either silver or halide can be called a first reactant depending upon which reactant is used to provide an input value for the concentration variable. In one important embodiment, the first reactant comprises halide ion and the second reactant comprises silver ion, and the precipitation reaction produces silver halide. Other reactions are also referenced in the detailed description. Further, specific formulas are presented herein to compute the referenced smoothed value of first reactant reactor concentration and to control the amount of reactant added to the precipitation vessel.

In another aspect, apparatus is provided for controlling halide ion concentration during the precipitation of a silver halide in a precipitation vessel. The apparatus includes first and second feed means for controllably introducing silver ion and halide ion, respectively, into the precipitation vessel. Each feed means produces a signal representative of the respective ion flow rate into the vessel. An ion sensor is also positioned within the precipitation vessel for generating a signal representative of the amount of halide ion in solution therein. Storage means is provided to receive the signal outputs of the first and second feed means and the ion sensor. A processor communicates with the storage means and determines an estimated smoothed value of halide ion concentration within the reactor as a function of the stored ion sensor output, and the first and second feed stream flow rate signals. Lastly, flow control means is provided for controllably adjusting at least one of the first and second feed means as a function of the computed smoothed value of excess halide ion concentration within the precipitation vessel to optimize the relative concentrations of reactants therein.

A primary object of the present invention is to provide a method and an apparatus for accurately controlling the relative concentrations of reactants within a precipitation reactor.

Another object of the present invention is to provide such a method and apparatus for adjustably controlling the inlet flow rate of at least one reactant to the precipitation vessel.

A further object of the present invention is to provide such a method and apparatus which are less susceptible to measurement noise than prior art control techniques.

A more particular object of the present invention is to provide such a method and apparatus which are capable of accurately controlling halide ion inlet flow rate to a silver halide precipitation reaction occurring within the reactor.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIGS. 9a and 9b graphically depict the same example as FIGS. 8a and 8b only, in contrast, using the concentration control method of the present invention.

DETAILED DESCRIPTION OF THE PREFERRED EMBODIMENTS

Figure 1:
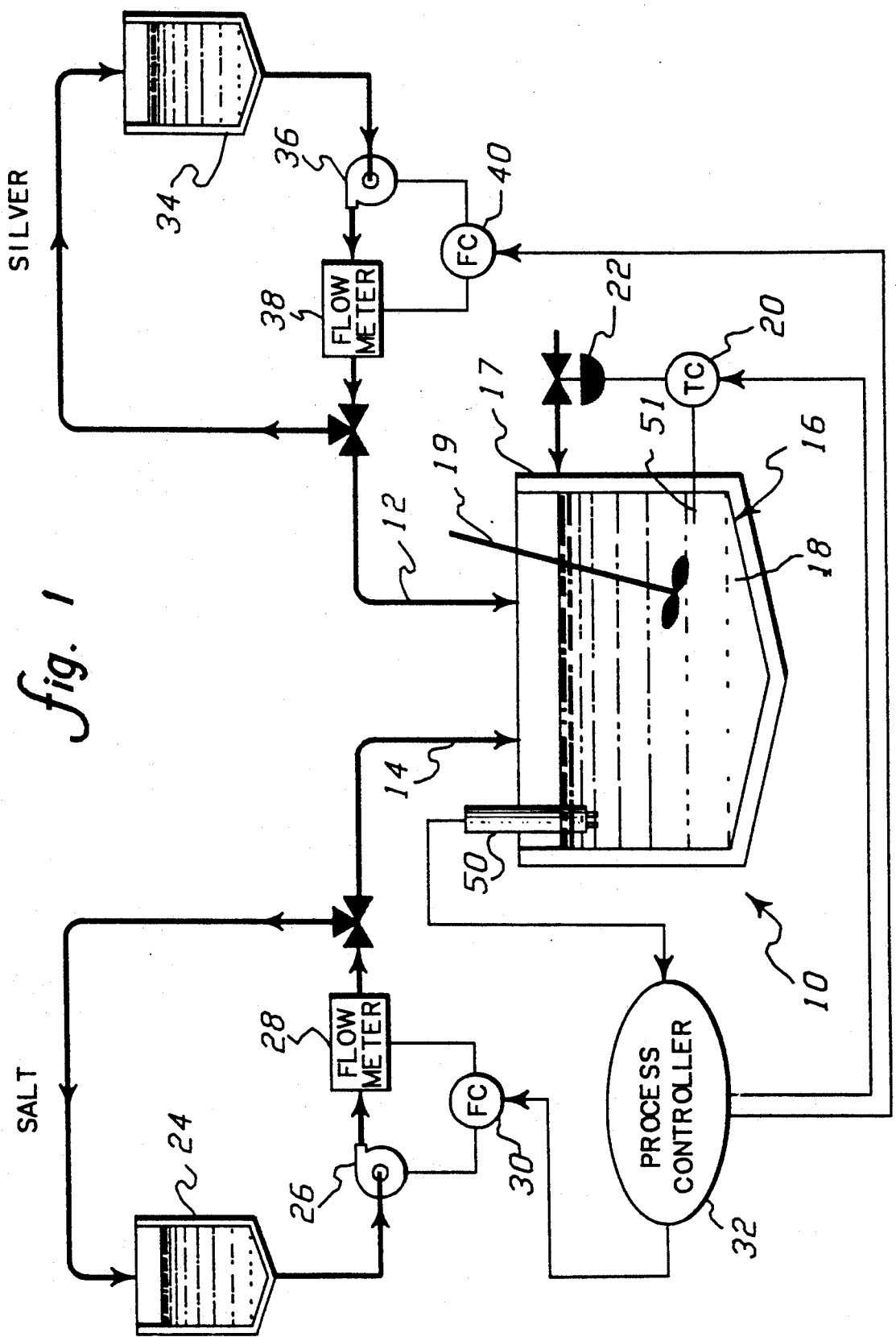
FIG. 1 is a partial schematic representation of a system for controlling the concentration of halide ion in the precipitation of a silver salt solution and a halide salt solution.

Referring to FIG. 1, precipitation and growth of silver halide (AgX) grains is generally carried out in a stirred tank reactor 10 with two continuously flowing inlet or feed streams, namely, an aqueous silver nitrate stream 12 and an aqueous salt stream 14, which typically comprises a solution of one or more halide salts (for example, NaBr and/or NaI). Reactor 10 includes a precipitation vessel 16 which holds the emulsion mix 18 at a substantially constant temperature. This is guaranteed by a temperature controller 20 which controls fluid movement within jacket 17 about vessel 16, i.e., via a valve 22. Emulsion mix 18 is agitated by a mixer 19.

Aqueous halide salt solution 14 is pumped from a storage vessel 24 to precipitation vessel 16 by means of a pump 26. Pump 26 responds to a power signal from a flow control circuit 30, which itself is controlled by a reactant concentration controller or process controller 32. A flow meter 28 is disposed at the output of pump 26 between the pump and precipitation vessel 16. Silver nitrate solution 12 is pumped in a similar manner from a storage vessel 34 by a pump 36 which is controlled by a flow controller 40. Flow controller 40 also receives signals from process controller 32. A flow meter 38 is disposed between pump 36 and precipitation vessel 16.

Submerged in mixture 18, within vessel 16, is a reactant concentration sensor 50. In one embodiment, sensor 50 comprises a halide ion concentration sensor. Sensor 50 and a temperature probe 51 are coupled to controller 32 via an appropriate buffer/interfacing device (not shown). The interfacing device functions to transform the analog signals from sensor 50 and probe 51 into corresponding digital signals.

Although an important application, the precipitation reaction depicted in FIG. 1, and in large part described in detail herein, is considered merely exemplary of a precipitation reaction to be controlled pursuant to the method and apparatus of the present invention. The techniques presented herein are equally applicable to other precipitation reactions wherein a first reactant $B^-$ and second reactant $C^+$ precipitate in a reactor in a batch process having the stoichiometric form: $A^+ + B^- + C^+ + D^- \rightarrow CB + A^+ + D^-$. As discussed previously, for the sake of uniformity in describing the method of the invention, the reactant for which both the concentration in the vessel and the flow rate into the vessel are inputs into the calculations will be called the first reactant (indicated generically in equations by "1R"); the reactant for which only the flow rate is an input will be called the second reactant (indicated generically in equations by "2R". For example, the process will function equally well for; a mixture of acids and bases, such as that encountered in waste water treatment or in certain industrial processes. One reaction with a similar stoichiometric equation is a mixture of hydrochloric acid and sodium hydroxide to produce water, a sodium ion and a chlorine ion. The claims appended hereto are intended to encompass a family of reactions having the same or an analogous stoichiometry to the above equation. For convenience, however, the detailed embodiments set forth herein will be presented in terms of the precipitation of silver halide. In the description of the silver halide precipitation example that follows, for the purpose of illustration only, a specific reaction between a halide ion, which corresponds to the general term "B" from the stoichiometric equation above, and a silver ion, which corresponds to the general term "C" from the equation above, is described were the halide ion (denoted generally by "X") is the first reactant as this term has been previously used, and the silver ion is the second reactant as this term has been previously used. In other words, rather than use the terms "first reactant" and "second reactant" in the equations that follow, the terms "X" and "Ag" will be used, respectively, throughout for the convenience of the reader.

As described further below, the processing technique of the present invention includes two particularly novel parts, namely an on-line estimator, and an adaptive control law. The on-line estimator contains a model of the reactor and the reactions occurring within it. This model contains one parameter which is assumed "unknown" but for which a "best estimated value" can be calculated so as to best fit the most recent observed dynamic behavior of the reactions within reactor 10. The past N values of reactor inputs (i.e., reactor feed stream flow rates, e.g., silver flow and halide flow) and the reactor output from sensor 50 (e.g., halide ion concentration within the reactor) are used as data to be fit by the model. Solving for the "best estimated value" of the parameter for a given set of input/output data is referred to as solving the parameter estimation problem. Each time a new reactor concentration measurement and a new set of inlet flow readings become available, a new parameter estimation problem is solved based upon the most recent N data values.

In a preferred embodiment, whenever the parameter estimation problem is solved, the calculated parameter value is substituted back into the model, and the model is applied to the stored input data to calculate a best estimate of the current halide concentration in the reactor. This estimate of halide concentration is dramatically quieter than the "raw" value, because it is based on the N last data points (for both input and output signals of the reactor) instead of simply the most recent output data point (e.g., measured halide ion concentration). Yet, it is able to instantly respond to true concentration changes unlike a simple digital filter or other similar technique. It is this quieter value that is then used in the calculation of the required salt feed flow rate adjustment.

Prior art sensitivity to errors in concentration and flow rate measurements is avoided by modifying the equations used to compute the required salt feed flow rate adjustment. The equations are in essence modified each time a new value of the model parameter is calculated. These equations are written so as to be a function of this parameter, and if the estimate of this parameter is accurate, then the required adjustment to the salt feed flow rate can be computed even in the presence of errors in the measured flow rates and feed concentrations.

In comparison the current practice is simply not to have an estimator at all. The most recent measured (observed) value is typically used directly, without any regard to the fact that it is likely contaminated with measurement noise. This approach has several disadvantages which are noted in the background section hereof.

Figure 2:
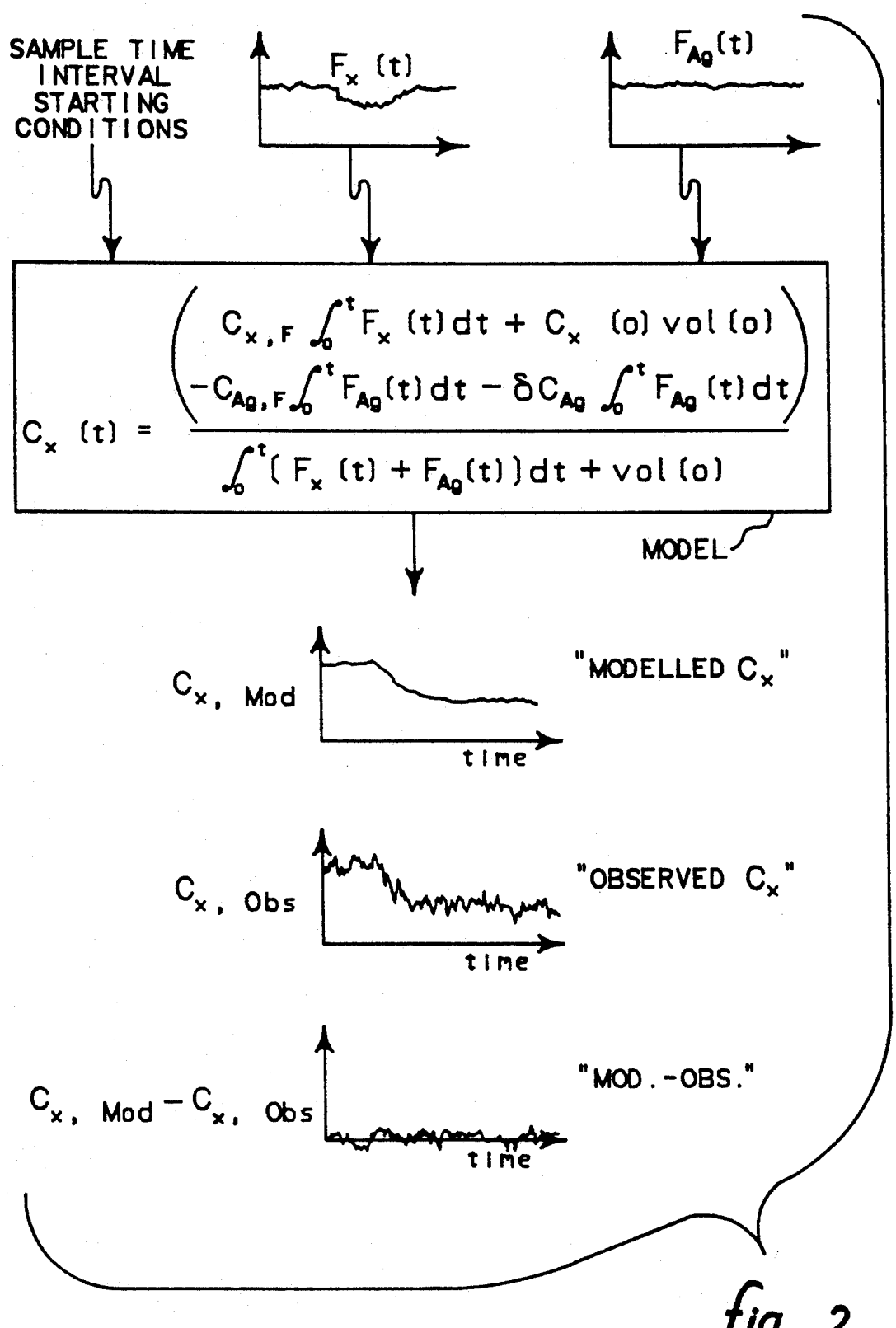
FIG. 2 is a graphical breakdown of the halide ion concentration estimation approach of the present invention.

The present approach, on the other hand, makes full use of the available information via a mathematical model of the precipitation reactor. This is illustrated graphically in FIG. 2, which shows that the process model uses three inputs (namely the reactor's condition at the start of the sample window, and the time histories of the two reactant feed streams $F_x(t)$, $F_{Ag}(t)$) to compute (via the equation set forth) a predicted or model behavior for the reactor's halide concentration, $C_{x,mod}$. This prediction is compared with the observed actual behavior, $C_{x,obs}$, over the same interval. An estimator is then used to adjust the model in such a way as to minimize the square of the difference between the model's predictions and the actual behavior. Finally, this adjusted model is used to provide a smoothed estimate of the reactor's current concentration. This process will now be described further with reference to the block diagram of FIG. 3.

The procedure is to "run" a model of the process in parallel with the real process (i.e., in parallel with actual delivery of Ag and X to reactor 10 via systems 11 and 13, respectively), and to give the model the same input flow history seen by the real process. This is the "Model of Reactor Behavior" block 102 in FIG. 3. The model will predict some halide concentration behavior, and this halide concentration behavior will be used as the best estimate of the halide concentration in the real reactor.

However, no model is perfect, and any model's predictions would eventually "drift" away from the behavior of the real process. To overcome this limitation, the model is continually adjusted to bring its predictions as closely as possible into agreement with the recent behavior of the process. This adjustment is accomplished by an "Estimator" 100.

The estimator's computed adjustment is also used to adjust the "Control Law" 104. This makes the control law adaptive, and removes its vulnerability to drifts in flow measurement calibration, and small errors in preparation of the reactants. With this adjustment, the control law can eliminate offset in the reactor concentration from the desired value.

As used herein, the following terms will have the meanings set forth:

$C_x(t)$ = reactor halide ion concentration at time t;
vol(t) = reactor liquid volume at time t;
$\Delta t$ = time interval of interest;
$F_X$ = flow rate of halide salt feed stream;
$C_{X,F}$ = concentration of halide salt feed stream;
$F_{Ag}$ = flow rate of silver nitrate feed stream;
$C_{Ag,F}$ = nominal concentration of silver nitrate feed stream;
$\overline{C_{Ag,F}}$ = true concentration of silver nitrate feed stream; and
$\delta C_{Ag}$ = error in nominal silver feed concentration.

Consider the silver halide precipitation reaction:

$$M^+X^- + Ag^+NO_3^- \rightarrow AgX + M^+NO_3^- \tag{1}$$

Here "M" typically denotes sodium or potassium, and "X" indicates iodine, bromine or chlorine. For present purposes, distinguishing between halide salts or mixtures of halide salts is unnecessary. However, two assumptions are made. First, the reaction is assumed to go irreversibly to completion and, second, the reaction where the stoichiometric amount of $M^+X^-$ present in the reactor exceeds the amount of silver nitrate present. Also, as discussed earlier, the equations in accordance with the present invention can be generalized for other embodiments by using the notation "1R" for the first reactant (indicated, in this specific example, by "halide" or "X") and "2R" for the second reactant (indicated by "Ag"). However, the generalized notation is not used in the following example so that the derivation of the following equations is easier to read.

Starting with these assumptions, the model is then built on the definition of concentration of free halide ions in the reactor at time t:

$$C_x(t) = \frac{\text{moles}_x(t)}{\text{volume}(t)} \tag{2}$$

Now, by simply subtracting the total amount of moles of silver nitrate delivered up to time t from the sum of the number moles of halide initially present, and the number of moles of salt delivered from the start to time t, the net total moles of halide ions remaining in the reactor at time t is obtained. (This provides the numerator of Equation 2.) If any volume change due to reaction is neglected, and the volumes delivered and initial volume present are summed, the total reactor volume at time t is known as well. (This provides the denominator of Equation (2).) Equation (2) can therefore be written:

$$C_x(t) = \frac{\left( C_{x,F} \int_0^t F_x(t)dt + C_x(0)\text{vol}(0) - \overline{C_{Ag,F}} \int_0^t F_{Ag}(t)dt \right)}{\int_0^t (F_x(t) + F_{Ag}(t))dt + \text{vol}(0)} \tag{3}$$

This expression shows how the halide concentration in the reactor at time (t) can, in principle, be calculated from these three pieces of information: the starting reactor conditions, the flow history of the halide salt feed stream and the flow history of the silver nitrate feed stream. An assumption is next made that the reactant flow rates are perfectly measured, and that the concentration of the salt feed stream is perfectly known. Also, the true concentration of the $AgNO_3$ feed stream, $\overline{C_{Ag,F}}$, is assumed to be not well known, but is in fact equal to its nominal concentration plus some unknown error, denoted $\delta C_{Ag}$:

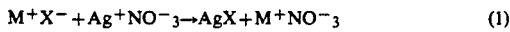

$$\overline{C_{Ag,F}} = C_{Ag,F} + \delta C_{Ag} \tag{4}$$

Substituting this into equation (3) and expanding yields:

$$C_x(t) = \frac{\left( \begin{array}{c} C_{x,F} \int_0^t F_x(t)dt + C_x(0)\text{vol}(0) - \\ C_{Ag,F} \int_0^t F_{Ag}(t)dt - \delta C_{Ag} \int_0^t F_{Ag}(t)dt \end{array} \right)}{\int_0^t (F_x(t) + F_{Ag}(t))dt + \text{vol}(0)} \tag{5}$$

For purpose of computer implementation it is convenient to replace the definite integrals in this formula with discrete approximations (where $t = n\Delta t$):

$$\int_0^t F_x(t)dt = \sum_{i=1}^n F_{x,i}\Delta t \tag{6}$$

$$\int_0^t F_{Ag}(t)dt = \sum_{i=1}^n F_{Ag,i}\Delta t \tag{7}$$

$F_{x,i}$ and $F_{Ag,i}$ refer to the flow rates of the salt feed stream and the silver nitrate feed stream, respectively, during the ith time interval. Replacing the integrals in equation (5) with these approximations yields:

$$C_{x,n} = \frac{\left( \begin{array}{c} C_{x,F} \sum_{i=1}^n F_{x,i}\Delta t + C_{x,0}\text{vol}(0) - \\ C_{Ag,F} \sum_{i=1}^n F_{Ag,i}\Delta t - \delta C_{Ag} \sum_{i=1}^n F_{Ag,i}\Delta t \end{array} \right)}{\sum_{i=1}^n (F_{Ag,i} + F_{x,i})\Delta t + \text{vol}(0)} \tag{8}$$

Now, for notational convenience the following two terms are defined:

$$\text{Ideal\_Halide\_Excess}_n = \left( \begin{array}{c} C_{x,F}\left(\sum_{i=1}^n F_{x,i}\Delta t\right) - \\ C_{Ag,F}\left(\sum_{i=1}^n F_{Ag,i}\Delta t\right) + \\ C_{x,0}\text{vol}(O) \end{array} \right) \tag{9}$$

$$\text{vol}_n = \sum_{i=1}^n (F_{Ag,i} + F_{x,i})\Delta t + \text{vol}(0) \tag{10}$$

These terms have direct physical interpretations. The $\text{Ideal\_Halide\_Excess}_n$ is the number of moles of free halide ion that are expected to be present in the reactor at the nth time sample if the nominal silver nitrate feed concentration, $C_{Ag,F}$, was exactly correct (i.e., $\delta C_{Ag} = 0$). As discussed previously, for a general stoichiometric reaction having $B^-$ as a first reactant and $C^+$ as a second reactant, the term "Ideal\_Halide\_Excess$_n$" is named "Ideal—$B^-$—Excess$_n$". The term "Ideal—Halide—Excess$_n$" is used in the context of this silver halide example merely for convenience. The second term is simply the total volume of liquid present in the reactor at the end of the nth interval. Now using these two terms, the expression for $C_{x,n}$ becomes:

$$C_{x,n} = \frac{\text{Ideal\_Halide\_Excess}_n - \delta C_{Ag}\left(\sum_{i=1}^{n} F_{Ag,i}\Delta t\right)}{\text{vol}_n} \quad (11)$$

This can be arranged into:

$$\Delta t \left(\sum_{i=1}^{n} F_{Ag,i}\right)\delta C_{Ag} = \text{Ideal\_Halide\_Excess}_n - (C_{x,n})(\text{vol}_n) \quad (12)$$

Equation (12) is true for any and all values of n:

$$\Delta t \left(\sum_{i=1}^{1} F_{Ag,i}\right)\delta C_{Ag} = \text{Ideal\_Halide\_Excess}_1 - (C_{x,1})(\text{vol}_1) \quad (13)$$

$$\Delta t \left(\sum_{i=1}^{2} F_{Ag,i}\right)\delta C_{Ag} = \text{Ideal\_Halide\_Excess}_2 - (C_{x,2})(\text{vol}_2) \quad (14)$$

$$\Delta t \left(\sum_{i=1}^{3} F_{Ag,i}\right)\delta C_{Ag} = \text{Ideal\_Halide\_Excess}_3 - (C_{x,3})(\text{vol}_3) \quad (15)$$

The following changes of variables are made for notational convenience:

$$b_j = \text{Ideal\_Halide\_Excess}_j - (C_{x,j})(\text{vol}_j)$$

$$a_j = \Delta t \sum_{i=1}^{j} F_{Ag,i}$$

Now equations (13) to (15) can be compactly rewritten in matrix form:

$$\begin{bmatrix} a_1 \\ a_2 \\ a_3 \\ \vdots \end{bmatrix} \delta C_{Ag} = \begin{bmatrix} b_1 \\ b_2 \\ b_3 \\ \vdots \end{bmatrix} \quad (16)$$

Letting the column vector on the left side of this equation be denoted A, and the vector on the right side B, this expression can be solved in a least squares sense for $\delta C_{Ag}$ (superscript T denotes the matrix transpose).

$$\delta C_{Ag} = \{A^T A\}^{-1} A^T B \quad (17)$$

Equation 17 may be expressed in its generic form for a second reactant as:

$$\delta C_{2R} = [A^1 A]^{-1} A^1 B$$

wherein:
$\delta C_{2R}$ = the error in excess second reactant feed stream concentration from nominal value $$A = \begin{bmatrix} a_1 \\ a_2 \\ a_3 \\ \vdots \end{bmatrix} \text{ wherein: } a_j = \Delta t \sum_{i=1}^{j} F_{2R,i}$$

$\Delta t$ = sample time interval of interest
$F_{2R,i}$ = flow rate of second reactant feed stream at sample time i
T = matrix transpose $$B = \begin{bmatrix} b_1 \\ b_2 \\ b_3 \\ \vdots \end{bmatrix} \text{ wherein: } b_j = \text{Ideal } B^- \text{Excess}_j - (C_{1R,j})(\text{Vol}_j)$$

Ideal $_{13}$ $B^-_{13}$ Excess$_j$ = number of moles of free first reactant expected in the reactor at the jth time interval if the feed concentration of the second reactant was exactly correct (i.e., $\delta C_{2R} = 0$)
$C_{1R,j}$ = first reactant reactor concentration at the jth time interval
Vol$_j$ = reactor liquid volume at the jth time interval.

This is the well known "normal equation" for linear least squares parameter estimation. But in this context, the expression is rather striking. What it means is that the parameter estimation calculation step, required to keep the model properly tracking the actual reactor behavior, is reduced to a simple one-line expression. This expression is very inexpensive to compute in real-time. This is the equation which is implemented by "Estimator" block 100 in FIG. 3. Also, note that Equation (17) and its supporting equations, as discussed previously, can be generalized for other embodiments by using the notation "1R" rather than "X", "2R" rather than "Ag", and "B" rather than "Halide".

Now that $\delta C_{Ag}$ is defined consideration can be given as to how it is used to compute the best estimate of the reactor conditions. (In other words, the implementation of "Model of Reactor Behavior" block 102 will now be described.) Returning to equation (11) and rearranging slightly yields:

$$C_{x,n,Est} = \frac{\text{Ideal\_Halide\_Excess}_n}{\text{vol}_n} - \delta C_{Ag}\frac{\left(\sum_{i=1}^{n} F_{Ag,i}\Delta t\right)}{\text{vol}_n} \quad (18)$$

Once again, this expression holds for any and all values of n:

$$C_{x,1,Est} = \frac{\text{Ideal\_Halide\_Excess}_1}{\text{vol}_1} - \delta C_{Ag}\frac{\left(\sum_{i=1}^{1} F_{Ag,i}\Delta t\right)}{\text{vol}_1} \quad (19)$$

$$C_{x,2,Est} = \frac{\text{Ideal\_Halide\_Excess}_2}{\text{vol}_2} - \delta C_{Ag}\frac{\left(\sum_{i=1}^{2} F_{Ag,i}\Delta t\right)}{\text{vol}_2} \quad (20)$$

$$C_{x,3,Est} = \frac{\text{Ideal\_Halide\_Excess}_3}{\text{vol}_3} - \delta C_{Ag} \frac{\left(\sum_{i=1}^{3} F_{Ag,i}\Delta t\right)}{\text{vol}_3} \quad (21)$$

The following definitions are made for convenience:

$$f_j = \frac{\text{Ideal\_Halide\_Excess}_j}{\text{vol}_j}$$

$$g_j = \frac{\left(\sum_{i=1}^{j} F_{Ag,i}\Delta t\right)}{\text{vol}_j}$$

Equations (19) to (21) can be rewritten in matrix form as:

$$\begin{bmatrix} \cdot \\ \cdot \\ C_{x,j,Est} \\ \cdot \\ \cdot \end{bmatrix} = \begin{bmatrix} \cdot \\ \cdot \\ f_j \\ \cdot \\ \cdot \end{bmatrix} - \delta C_{Ag} \begin{bmatrix} \cdot \\ \cdot \\ g_j \\ \cdot \\ \cdot \end{bmatrix} \quad (22)$$

Figure 3:
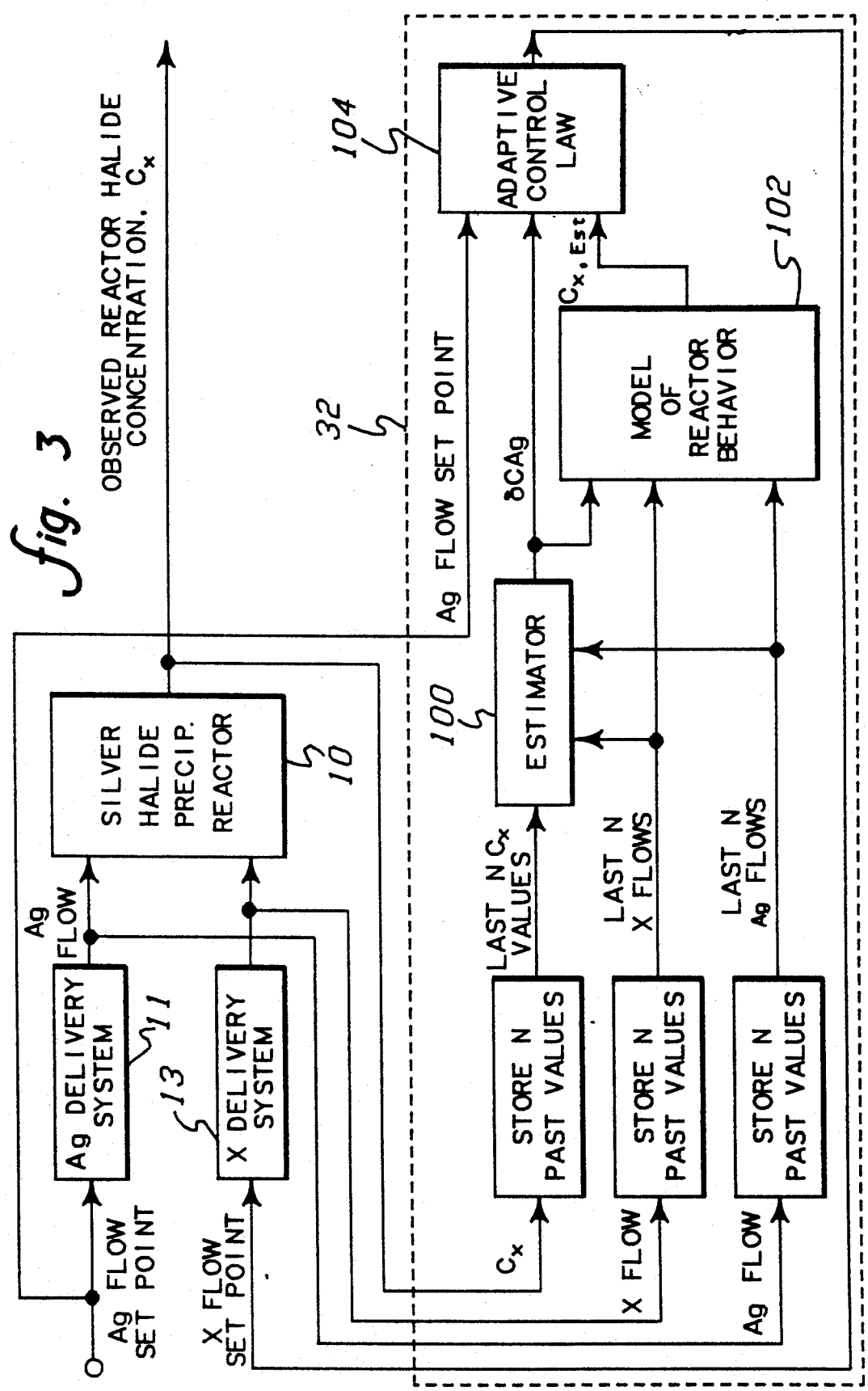
FIG. 3 is a block diagram representation of the control components of the present invention.

The nth estimate of the reactor concentration can be computed by simply evaluating this expression for the case where j=n. So this expression also has very low computational cost. This is how block 102 in FIG. 3, is implemented. Also, Equation (22) and its supporting equations, as discussed previously, can be generalized by using the notation "1R" instead of "X", "2R" instead of "Ag", and "B" instead of "Halide". Equation 22 may thus be expressed in its generic form for a first reactant as:

$$\begin{bmatrix} \cdot \\ \cdot \\ C_{1R,j,Est} \\ \cdot \\ \cdot \end{bmatrix} = \begin{bmatrix} \cdot \\ \cdot \\ f_j \\ \cdot \\ \cdot \end{bmatrix} - \delta C_{2R} \begin{bmatrix} \cdot \\ \cdot \\ g_j \\ \cdot \\ \cdot \end{bmatrix}$$

$C_{1R,j,Est}$ = smoothed value of first reactant concentration at the jth time interval $$f_j = \frac{\text{Ideal } B\text{-Excess}_j}{\text{vol}_j}$$

$$g_j = \frac{\left(\sum_{i=1}^{j} F_{2R,i}\Delta t\right)}{\text{vol}_j}$$

To summarize, the estimator first uses equation (17) to compute the current value of $\delta C_{Ag}$. Next, this value of $\delta C_{Ag}$ is used in equation (22) for the case where j=n, which results in the best smoothed estimate of the current reactor halide concentration. This process is repeated at every sampling interval. The estimated concentration provided by Equation (22) is a smoothed value, in part, because N stored measured halide concentrations, halide feed stream flow rates, and silver feed stream flow rates ar used to determine $C_{x,j,Est}$, as is indicated by the derivation shown for Equations (17) to (22). this is in contrast to the current practice of simply using the most recent measured (observed) value for the halide ion concentration, which is likely to be contaminated with measurement noise.

One question which immediately arises in evaluation of equation (17) is: Which point in time should be defined as the "initial point". There are basically two approaches: either use the beginning of the batch; or use the reactor state as it was N samples ago. (If N samples ago was before the start of the batch, then use the batch starting conditions.)

An important feature of the approach described here is that only N past data values are retained. The alternative of retaining all past values since the beginning of the batch is rejected in favor of this approach because by retaining only N past values an upper limit is put on the number of past points to be used and this limits the required computational cost. This also has the effect of only using the most recent data, which allows a simplified model to be used which provides good local fit to the observed reactor behavior, even if the model is incapable of fitting the reactor's behavior over a long period of operation. In practice, the value selected for N will depend on the sample-rate of the process computer. A typical value for a sample-rate of once every 5 seconds is to take N=10. However, N can range, for example, anywhere up to around 200 at higher sampling rates. A reasonable rule of thumb is to retain data over approximately the past minute.

Since only the N past samples are being retained, a question arises when one goes to evaluate any of the Ideal—Halide—Excess terms and the batch has been in progress for longer than N samples. This is the issue of what to use for the "starting value" or $C_{x,o}$.

Figure 4A:
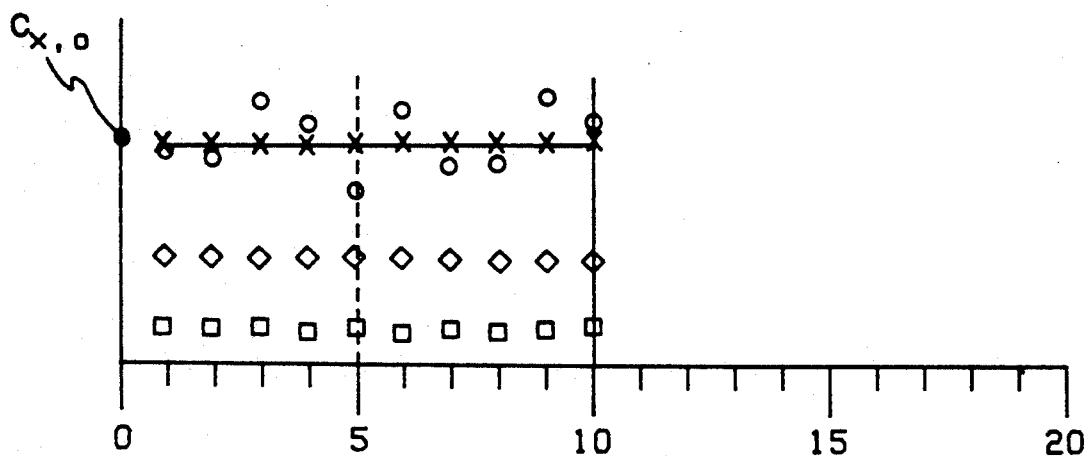
FIGS. 4a and 4b graphically depict an example of observed halide and silver flow rates and observed halide ion concentrations within the reactor and estimated halide ion concentrations over a sample measurement window.
Figure 4B:
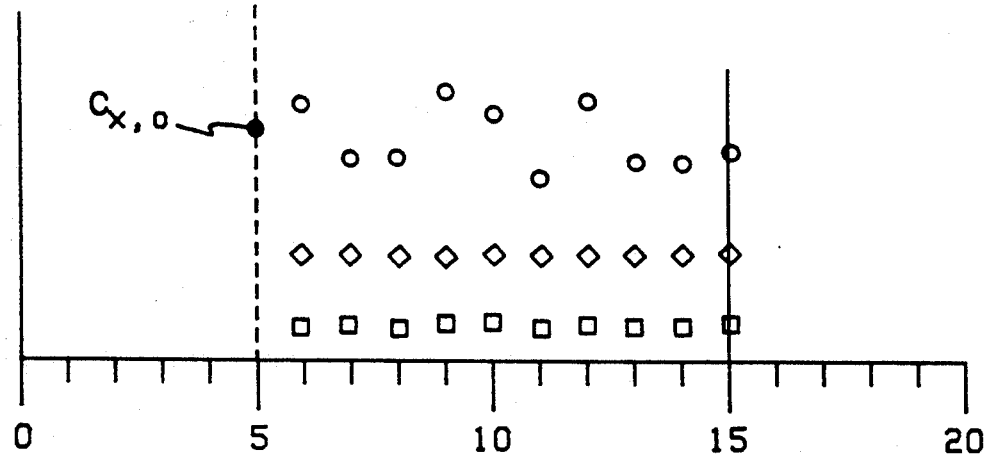

FIGS. 4A and 4B illustrate the problem. FIG. 4A is drawn for the case of N=10, wherein the 10th sample in the batch is being processed. In this figure, the squares represent the last 10 measurements of the silver nitrate feed stream flow rate. The diamonds are the last 10 halide salt feed stream flow rates and the circles are the last 10 halide ion concentration, $C_x$, observations. The circles, diamonds and squares together represent the data required by the estimator in order for it to compute its best estimate of the true behavior of the reactor over the interval covered by the last 10 samples. (This estimate is shown in this figure as the X's connected by a solid line.) However, there is one more piece of information required before the estimates can be computed, and that is the reactor's initial halide concentration, $C_{x,o}$, at the beginning of the interval. In FIG. 4A, it is easy to see that $C_{x,o}$ simply corresponds to the reactor's starting halide concentration at the beginning of the batch.

But consider the situation 5 sample times later, as shown in FIG. 4B. Now, the beginning of the interval corresponds to the point where t=5 instead of the beginning of the batch. There are several possibilities for $C_{x,o}$ in this case. One possibility is to simply use the measurement of $C_x$ at t=5. However, this is not the best choice, since the raw concentration measurements are known to be corrupted by noise. A better choice is to take advantage of the estimator and use an estimated value for this term. The particular estimated value to be selected is the one from 5 sample times ago, at the point t=5, i.e., at the center of the 10-sample interval. This is depicted graphically by the vertical dashed line connecting FIG. 4A with 4B. The circle at t=5 in FIG. 4A is not used, however, for a value for $C_{x,o}$ in FIG. 4B. Instead the estimated value at t=5 in FIG. 4A is chosen for $C_{x,o}$ in FIG. 4B. In the general case, the value for $C_{x,o}$ will be the following: the estimate as of N/2 samples ago of the reactor halide concentration for that point in time.

How the results of "Estimator" block 100 and "Adaptive Control Law" block 104 are used to improve control will next be examined.

At each time step, the process computer must set the desired salt flow rate. Ideally, the computer selects a flow rate that will hold the reactor halide concentration at the desired set point value, or if the current value differs from the set point value, a salt flow rate will be chosen that moves the reactor halide concentration towards the desired set point value. The control law is the equation which is used at each time step to compute the value for the desired salt flow rate for the next sample interval. This equation is evaluated at each sample time to see what value should be sent to the salt flow controller for the next control interval.

The control law is based on the same definition of concentration as the estimation, i.e., equation (2). Equation (2) can be evaluated at the time $t+\delta t$ as well:

$$C_x(t + \delta t) = \frac{\left( C_x(t)\text{vol}(t) + C_{x,F}\int_{t}^{t+\delta t} F_x(t)dt - \overline{C_{Ag,F}}\int_{t}^{t+\delta t} F_{Ag}(t)dt \right)}{\text{vol}(t) + \int_{t}^{t+\delta t}(F_x(t) + F_{Ag}(t))dt} \quad (23)$$

In equation (23), the integrals are simply to account for the salt and silver feeds added during the interval from t to $t+\delta t$. If an assumption is made that $F_{Ag}$ and $F_x$ will be constant over $[t, t+\delta t]$, then these integrals reduce to simple multiplications. The following substitution can also be made: let $C_x(t+\delta t) = C_{x,Set}$. This is done to ascertain the salt flow rate required to force the reactor concentration at the end of the interval to be at the desired set point. With these changes equation (23) becomes:

$$C_{x,Set} = \frac{\left( C_x(t)\text{vol}(t) + C_{x,F}F_x\delta t - \overline{C_{Ag,F}}F_{Ag}\delta t \right)}{\delta t(F_x + F_{Ag})dt + \text{vol}(t)} \quad (24)$$

This equation is now solved for $F_x$ on the left hand side, yielding:

$$F_x = \frac{F_{Ag}\delta t(\overline{C_{Ag,F}} + C_{x,Set}) + \text{vol}(t)(C_{x,Set} - C_x(t))}{\delta t(C_{x,F} - C_{x,Set})} \quad (25)$$

which may be rearranged into the following form:

$$F_x = F_{Ag}\frac{(C_{Ag,F} + C_{x,Set})}{(C_{x,F} - C_{x,Set})} + \frac{\text{vol}(t)(C_{x,Set} - C_x(t))}{\delta t(C_{x,F} - C_{x,Set})} \quad (26)$$

The current practice makes two simplifying changes to this equation:

For $C_{Ag,F}$ simply use: $C_{Ag,F}$. (This assumes there is no error in the nominal silver nitrate feed concentration.)

For $C_x(t)$ simply use the most recent measured value. (Nothing is done about any noise in this observation.)

This results in the following formula for the current control law:

$$F_x = F_{Ag}\frac{(C_{Ag,F} + C_{x,Set})}{(C_{x,F} - C_{x,Set})} + \frac{\text{vol}(t)(C_{x,Set} - C_x(t))}{\delta t(C_{x,F} - C_{x,Set})} \quad (27)$$

However, with the estimator a significantly better approximation is obtainable. First note that the first term in equation (27) above must be effected by any error in the nominal silver nitrate feed concentration, $C_{Ag,F}$. In practice, this quantity is never perfectly correct. However, the estimator is designed to adjust this very value to give the best fit to the most recent observed reactor behavior, and this can be used in the control law. Also, the most recent observed reactor concentration does not have to be used, i.e., the estimator's best smoothed estimate of the true reactor concentration can be used instead. Summarizing, the new alternatives to the above two simplifications are:

For $C_{Ag,F}$ use: $C_{Ag,F} + \delta C_{Ag}$ (Include best estimate of error in first term).

For $C_x(t)$ use: $C_{X,Est}$ (Use the best smoothed estimate of reactor state or concentration value. Under these substitutions equation (27) becomes:

$$F_x = F_{Ag}\frac{((C_{Ag,F} + \delta C_{Ag}) + C_{x,Set})}{(C_{x,F} - C_{x,Set})} + \frac{\text{vol}(t)(C_{x,Set} - C_{x,Est}(t))}{\delta t(C_{x,F} - C_{x,Set})} \quad (28)$$

Equation (28) is the proposed new adaptive control law. It is adaptive because the $\delta C_{Ag}$ term is used, which as noted above tracks recent reactor behavior. It gives a smoother calculated $F_x$ value because it uses the estimated reactor halide concentration instead of the raw direct observations. It is Equation (28) which is implemented in block 104 of FIG. 3. Also, Equation (28) and its supporting equations, as discussed previously, can be generalized by using the notation "1R" instead of "X" and "2R" instead of "Ag".

Figure 5:
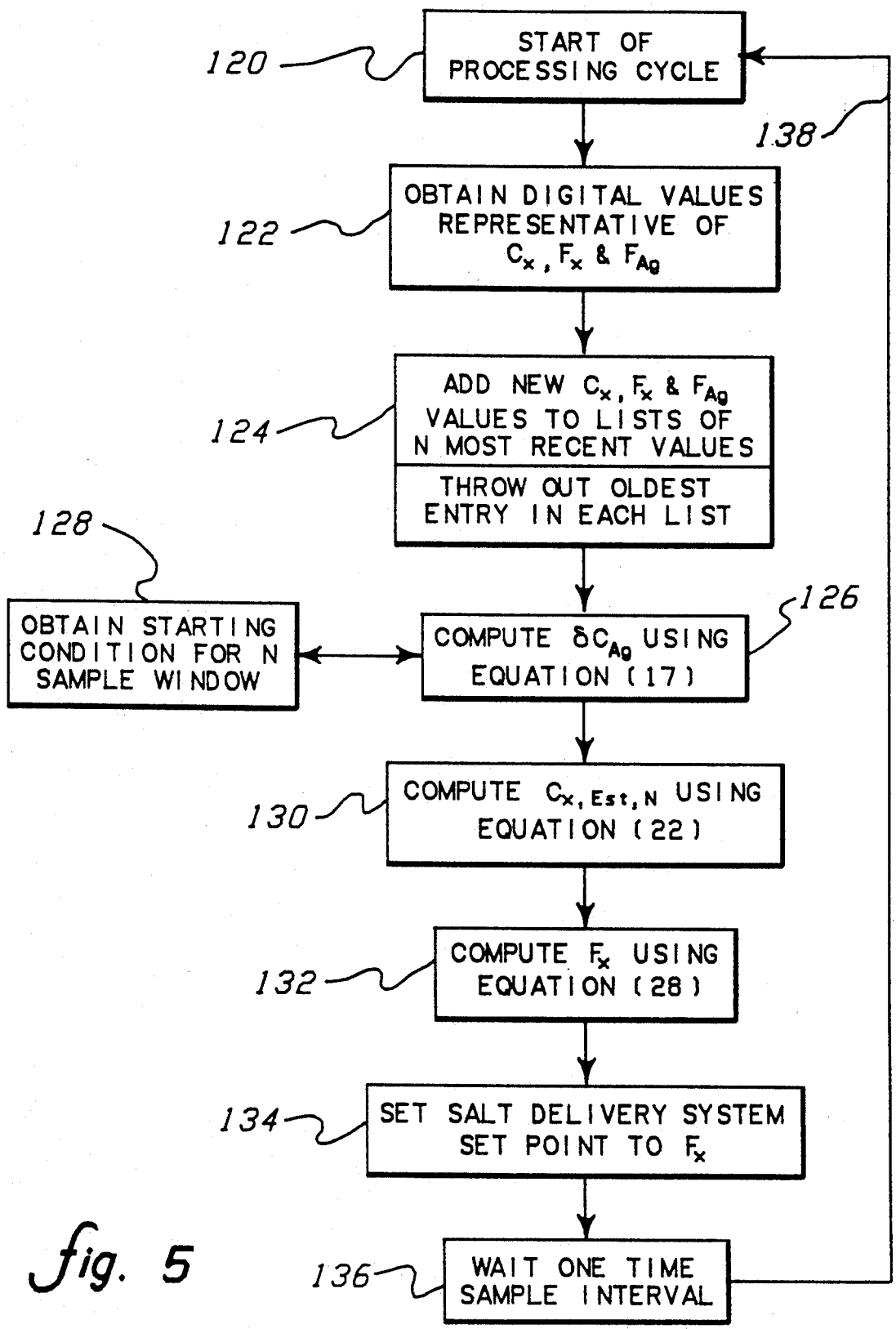
FIG. 5 is functional flow diagram of the processing technique of the present invention.

In summary, FIG. 5 presents a flowchart of the processing technique of present invention. Subsequent start of a processing cycle, 120 "Start of Processing Cycle," control processor 32 (see FIG. 1) obtains an observed or measured value of the halide ion concentration, the flow rate of the halide feed stream and the flow rate of the silver feed stream, 122 "Obtain Digital Values Representative of $C_x$, $F_x$ and $F_{Ag}$." These new values for $C_x$, $F_x$ and $F_{Ag}$ are then added to the list of N most recent values, with the oldest values being discarded upon receipt of the newest, 124 "Add New $C_x$, $F_x$, $F_{Ag}$ Values to Lists of N Most Recent Values; Throw Out Oldest Entry in Each List." After updating the list, processor 32 computes the error in silver ion concentration within the precipitation reactor. This is accomplished using equation (17) set forth above, 126 "Compute $\delta C_{Ag}$ using equation (17)." As discussed, computation of the error in silver concentration requires the processor to obtain starting conditions for the N sample window under process, 128 "Obtain Starting Condition for N Sample Window." After computing the error in silver concentration, the processor computes an estimated smoothed value for halide ion concentration within the reactor using equation (22), 130 "Compute $C_{x,Est,n}$ Using Equation (22)." Subsequent to determining a smoothed, estimated value for the concentration of halide within the reactor using Equation (22) the processor calculates an optimal flow rate halide salt feed stream, 132 "Compute $F_x$ Using Equation (28)," and the salt delivery set point is set to this calculated optimal flow rate $F_x$, 134 "Set Salt Delivery System Set Point to $F_x$." The processor then is directed to wait for the next time interval, 136 "Wait Time Sample Interval," and then return to 120, "Start of Processing Cycle," via 138. The on-line estimator concept is extendible to multiple feed streams. The necessary modifications to blocks 100 and 102 of FIG. 3 to accomplish this will now be explained. For purposes of illustration consider the case of three silver nitrate feeds and three halide salt feeds. The extension to other numbers of feeds will follow by obvious analogy. The main changes are in the ideal_Halide_Excess$_n$ and Vol$_n$ terms as defined in equations (9) and (10). The following new terms for this section are defined:

$F_{x1}$ = flow rate of 1st salt stream (control salt);
$F_{x2}$ = flow rate of 2nd salt stream;
$F_{x3}$ = flow rate of 3rd salt stream;
$C_{x1}$ = concentration of 1st salt (control salt);
$C_{x2}$ = concentration of 2nd salt;
$C_{x3}$ = concentration of 3rd salt;
$F_{Ag1}$ = flow rate of 1st silver stream;
$F_{Ag2}$ = flow rate of 2nd silver stream;
$F_{Ag3}$ = flow rate of 3rd silver stream;
$C_{Ag1}$ = concentration of 1st silver;
$C_{Ag2}$ = concentration of 2nd silver;
$C_{Ag3}$ = concentration of 3rd silver;
$\delta C_{Ag1}$ = error in nominal concentration of silver feed 1.

Using these definitions, Equations (9) and (10) become for the multiple feed case:

$$\text{Ideal\_Halide\_Excess}_n = \begin{pmatrix} C_{x1,F}\left(\sum_{i=1}^{n} F_{x1,i}\Delta t\right) + \\ C_{x2,F}\left(\sum_{i=1}^{n} F_{x2,i}\Delta t\right) + \\ C_{x3,F}\left(\sum_{i=1}^{n} F_{x3,i}\Delta t\right) - \\ C_{Ag1,F}\left(\sum_{i=1}^{n} F_{Ag1,i}\Delta t\right) - \\ C_{Ag2,F}\left(\sum_{i=1}^{n} F_{Ag2,i}\Delta t\right) - \\ C_{Ag3,F}\left(\sum_{i=1}^{n} F_{Ag3,i}\Delta t\right) + \\ C_{x,0}\text{vol}(0) \end{pmatrix} \quad (29)$$

$$\text{vol}_n = \sum_{i=1}^{n}(F_{Ag1,i} + F_{Ag2,i} + F_{Ag3,i} + F_{x1,i} + F_{x2,i} + F_{x3,i})\Delta t + \text{vol}(0) \quad (30)$$

These terms have the same interpretations as before. The Ideal_Halide_Excess$_n$ is the number of moles of free halide ions that would be expected to be present in the reactor at the nth time if the nominal silver nitrate feed concentration, $C_{Ag1,F}$, was exactly correct (i.e., $\delta C_{Ag1}$=0). Equation (30) is simply the total volume of liquid present in the reactor at the end of the nth interval. Now, using these two terms, the expression for $C_{x,n}$ becomes:

$$C_{x,n} = \frac{\text{Ideal\_Halide\_Excess}_n - \delta C_{Ag1}\left(\sum_{i=1}^{n} F_{Ag1,i}\Delta t\right)}{\text{vol}_n} \quad (31)$$

Equation (31) can be rearranged into:

$$\Delta t\left(\sum_{i=1}^{n} F_{Ag1,i}\right)\delta C_{Ag1} = \text{Ideal\_Halide\_Excess}_n - (C_{x,n})(\text{vol}_n) \quad (32)$$

This equation is true for any and all values of n:

$$\Delta t\left(\sum_{i=1}^{1} F_{Ag1,i}\right)\delta C_{Ag1} = \text{Ideal\_Halide\_Excess}_1 - (C_{x,1})(\text{vol}_1) \quad (33)$$

$$\Delta t\left(\sum_{i=1}^{2} F_{Ag1,i}\right)\delta C_{Ag1} = \text{Ideal\_Halide\_Excess}_2 - (C_{x,2})(\text{vol}_2) \quad (34)$$

$$\Delta t\left(\sum_{i=1}^{3} F_{Ag1,i}\right)\delta C_{Ag1} = \text{Ideal\_Halide\_Excess}_3 - (C_{x,3})(\text{vol}_3) \quad (35)$$

The following changes of variables are made for notational convenience:

$$a_j = \Delta t \sum_{i=1}^{j} F_{Ag1,i}$$

$$b_j = \text{Ideal\_Halide\_Excess}_j - (C_{x,j})(\text{vol}_j)$$

Now equations (33) to (35) can be compactly rewritten in matrix form:

$$\begin{bmatrix} a_1 \\ a_2 \\ a_3 \\ \cdot \\ \cdot \\ \cdot \end{bmatrix} \delta C_{Ag1} = \begin{bmatrix} b_1 \\ b_2 \\ b_3 \\ \cdot \\ \cdot \\ \cdot \end{bmatrix} \quad (36)$$

This expression can be "solved" in a least squares sense for $\delta C_{Ag}$:

$$\delta C_{Ag1} = \{A^T A\}^{-1} A^T B \quad (37)$$

This expression is then used the same way as equation (17).

The remainder of the processing proceeds as before, except that $\delta C_{Ag}$ is replaced with $\delta C_{Ag1}$ and $F_{Ag,i}$ is replaced with $F_{Ag1,i}$.

The basic derivation of the control law equation for the case of multiple salt and silver streams will next be presented. Once again, for purposes of illustration, the case of three salt and three silver feed streams is considered. The extension to other numbers of feeds proceeds by obvious analogy. In any case, only one salt stream is selected for manipulation to control reactor halide concentration. This is denoted the "control salt."

The objective is to calculate the required value for $F_{x1}$ over the next time step, such that the reactor halide concentration will be brought to the set point. Applying a simple mass balance over the interval from t to t+δt gives:

$$C_{x,set} = (C_x(t)\text{Vol}(t) + C_{x1}F_{x1}\delta t + C_{x2}F_{x2}\delta t + C_{x3}F_{x3}\delta t - \quad (38)$$

$$(C_{Ag1}F_{Ag1}\delta t - C_{Ag2}F_{Ag2}\delta t - C_{Ag3}F_{Ag3}\delta t)/(\delta t(F_{x1} + F_{x2} +$$

$$F_{x3} + F_{Ag1} + F_{Ag2} + F_{Ag3}) + \text{Vol}(t))$$

Rearranging equation (38) by cross multiplying, gathering terms with $F_{x1}$ alone on the left, and finally solving for $F_{x1}$ alone, yields:

$$F_{x1} = \frac{\text{Vol}(t)(C_{x,set} - C_x(t))}{(C_{x1} - C_{x,set})\delta t} - F_{x2}\frac{(C_{x2} - C_{x,set})}{(C_{x1} - C_{x,set})} - \quad (39)$$

$$F_{x3}\frac{(C_{x3} - C_{x,set})}{(C_{x1} - C_{x,set})} + F_{Ag1}\frac{(C_{Ag1} + C_{x,set})}{(C_{x1} - C_{x,set})} +$$

$$F_{Ag2}\frac{(C_{Ag2} + C_{x,set})}{(C_{x1} - C_{x,set})} + F_{Ag3}\frac{(C_{Ag3} + C_{x,set})}{(C_{x1} - C_{x,set})}$$

Equation (39) could be coded into a process computer as is, but the convention is to replace the reciprocal of δt in the first term on the right with a simple proportionality constant, $K_c$, which is referred to as the "feedback gain" since the first term is the only term with the observed error in it. The result is the current control law for the case where multiple salt and silver streams are active at the same time. The extension to additional streams of salt or silver is straightforward from equation (39).

The same improvements that were made in Equations (27) to (28) can be applied here as well:

For $C_{Ag}$ use: $C_{Ag1}+\delta C_{Ag1}$ (Include best estimate of error in first silver feed concentration).

For $C_x(t)$ use: $C_{x,Est}$ (Use the best smoothed estimate of reactor state, or concentration value).

Under these substitutions equation (39) becomes:

$$F_{x1} = K_c\frac{\text{Vol}(t)(C_{x,set} - C_{x,Est}(t))}{(C_{x1} - C_{x,set})} - F_{x2}\frac{(C_{x2} - C_{x,set})}{(C_{x1} - C_{x,set})} - \quad (40)$$

$$F_{x3}\frac{(C_{x3} - C_{x,set})}{(C_{x1} - C_{x,set})} + F_{Ag1}\frac{((C_{Ag1} + \delta C_{Ag1}) + C_{x,set})}{(C_{x1} - C_{x,set})} +$$

$$F_{Ag2}\frac{(C_{Ag2} + C_{x,set})}{(C_{x1} - C_{x,set})} + F_{Ag3}\frac{(C_{Ag3} + C_{x,set})}{(C_{x1} - C_{x,set})}$$

Equation (40) is the form of the new adaptive control law in the case of multiple salt and silver nitrate feed streams.

Three examples of actual reactor concentration control during the precipitation of silver bromide will now be presented to illustrate the performance advantage of the new method. The data from all of these examples were taken on a pilot scale silver halide precipitation reactor equipped with a process computer to make measurements of flow rates and concentrations, and to perform the computations required for both the conventional and new methods of concentration control.

For all of the examples presented, there were two feed streams: one of 3.5 molar silver nitrate, and the other of 3.5 molar potassium bromide. In every case, the process computer was sampling the reactor concentration and recomputing the salt feed flow set point at a rate of once per second. The computer was sampling and adjusting both feed flow rates at a speed of 10 times per second.

EXAMPLE 1

Figure 6A:
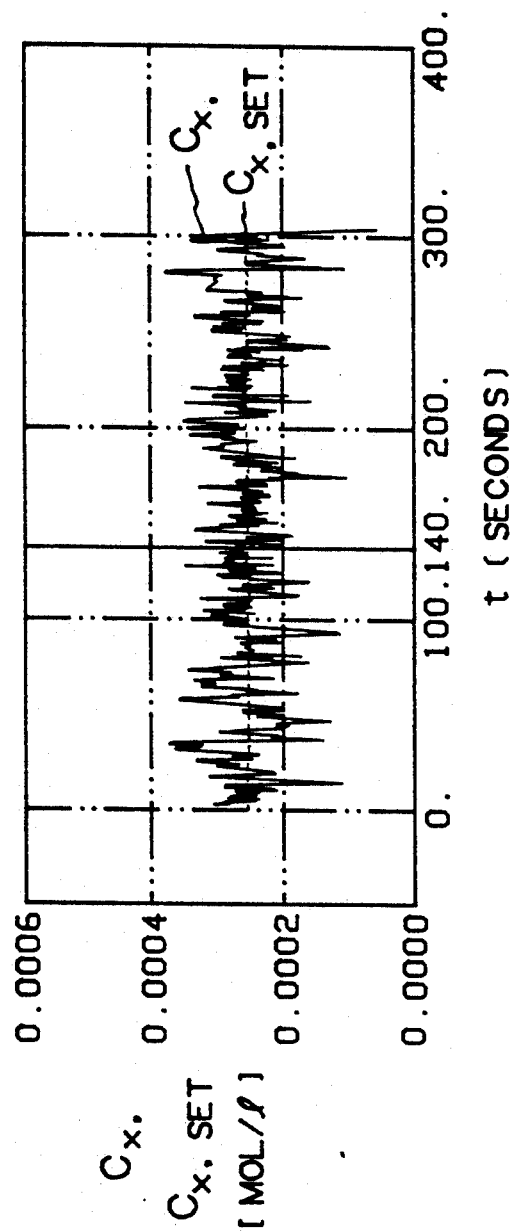
FIGS. 6a and 6b graphically depict one example of reactant concentration control pursuant to the present invention.
Figure 6B:
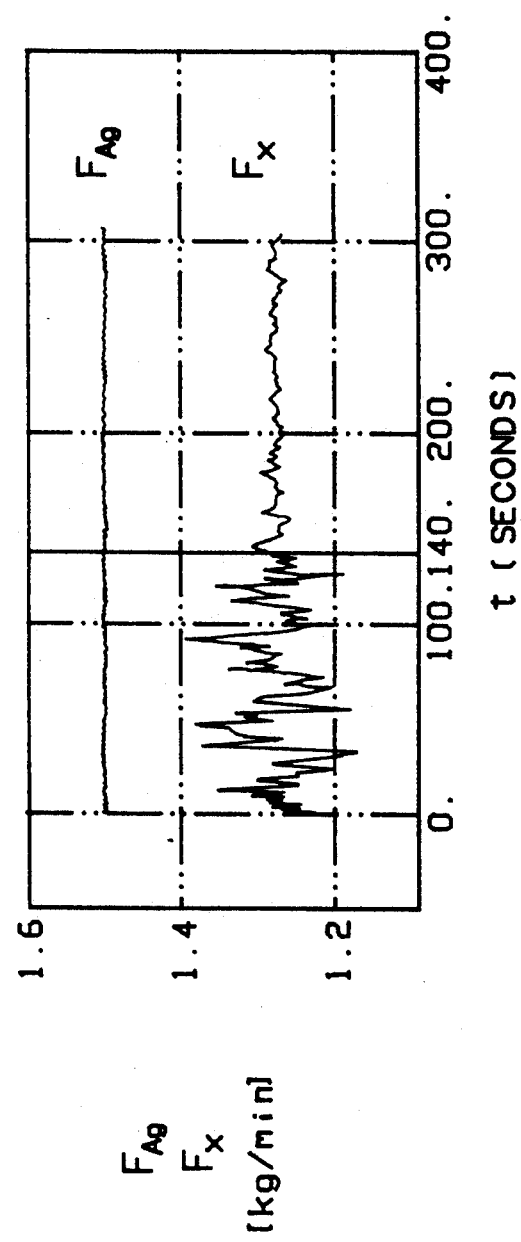

In this example, the control system is attempting to hold the reactor halide concentration at 0.248 millimoles per liter while the silver feed rate into the reactor is held at a constant 1.5 kilograms per minute (kg/min). In FIG. 6A, the actual $C_x$ measurements, as well as the desired set point, $C_{x,set}$, are plotted versus time in seconds. The noise in the concentration measurement is readily seen in this graph. In FIG. 6B, the measured flow rates for the salt and silver feed streams are shown. Note the smooth silver feed flow rate compared to the salt feed flow rate. This is because the silver flow rate set point is held at a constant 1.5 kg/min, while the salt feed flow rate is recomputed and changed once every second by the process computer in response to measured changes in the $C_x$ signal and, as is readily seen in FIG. 6A, the $C_x$ signal is noisy.

Note, however, that after approximately 140 seconds, the salt stream's level of variation is dramatically reduced. This is because it is at the 140 second point that the control algorithm was switched from the conventional method to the new method (Eqs. (17), (22) and (28), with 1/δt=0.4, N=60) as described above. Comparison of FIGS. 6A and 6B shows that switching to the new control algorithm causes no loss of control of reactor halide concentration, but does give a dramatic reduction in salt flow variability.

EXAMPLE 2

In this example, the control system is attempting to hold the reactor halide concentration at 0.120 millimoles per liter while the silver feed rate into the reactor is held at a constant 0.3 kg/min. However, in this case the process computer has been intentionally misinformed about the concentration of the silver nitrate feed. Instead of entering the true value of 3.5 molar for $C_{Ag}$, a value of 3.325 molar has been misentered, a 5 percent error. This is to simulate the effects of an error in feed preparation.

Figure 7A:
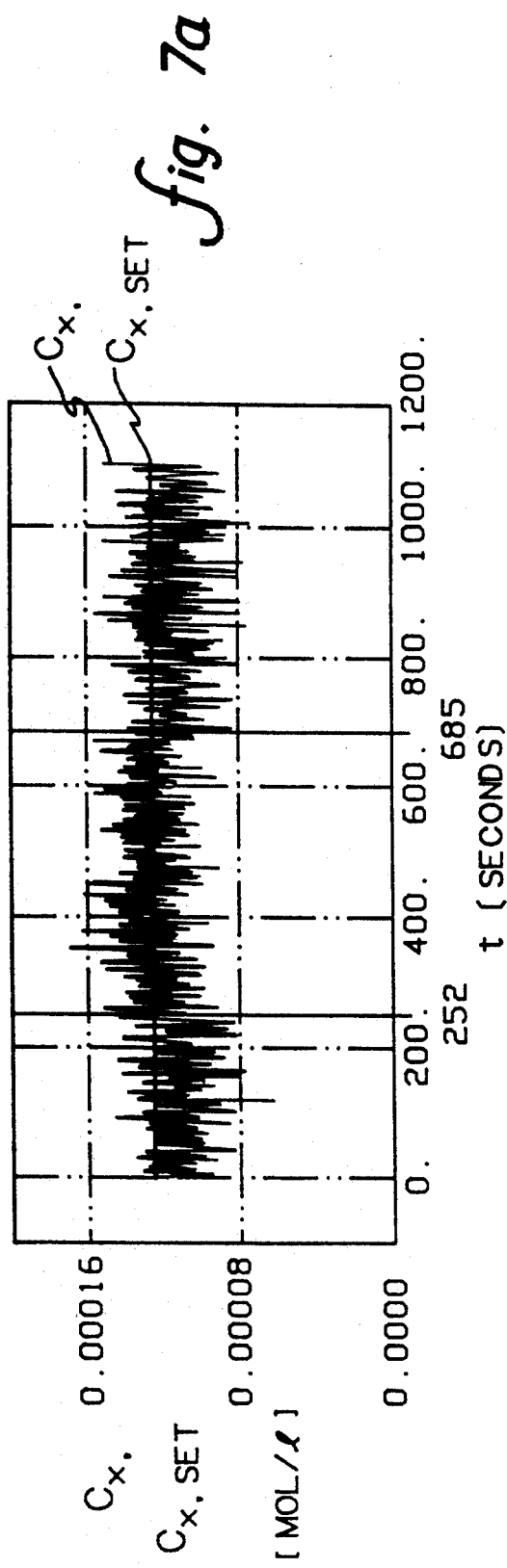
FIGS. 7a and 7b graphically depict a second example of reactant concentration control pursuant to the present invention.

In FIG. 7A, the actual $C_x$ measurements, as well as the desired set point, $C_{x,set}$, are plotted versus time in seconds. This time at t=252 seconds the control algorithm was switched from the conventional method to the new method (Eqs. (17), (22) and (28), with 1/δt=0.4, N=60) as described above. Then, at t=685 seconds, return was made to the conventional control algorithm. Note that when conventional control is in effect, the concentration stays below the desired set point and the conventional approach cannot eliminate this sustained offset from the set point. It is only when the new algorithm is running that this offset from the set point is eliminated. This is because only the new algorithm can properly adapt to the error in $C_{Ag}$. In fact, the conventional algorithm cannot even hold the correct set point even when the process is already there when the conventional algorithm takes over. (When return was made to the conventional algorithm at t =685 seconds, the reactor concentration fell back down to its old offset position.) This is because the conventional approach will always be using the incorrect value of 3.325 molar for $C_x$ whereas the new processing technique quickly adapts to the correct value of 3.5 molar.

Figure 7B:
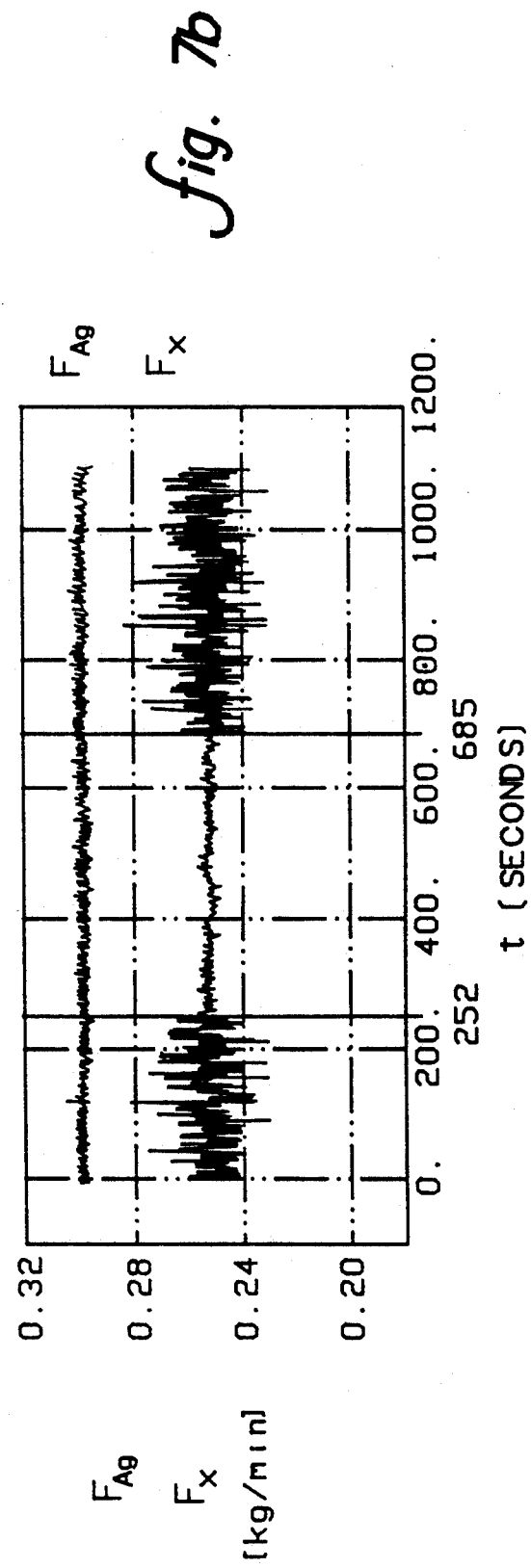

In FIG. 7B, the measured flow rates for the salt and silver feed streams are shown. Note the relative smoothness in the silver feed flow rate compared to the salt feed rate, especially outside the interval from t=252 to t=685 seconds. This is because the silver flow rate set point is held at a constant 0.3 kg/min, while the salt feed flow rate is recomputed and changed once every second by the process computer in response to measured changes in the $C_x$ signal and, as is readily seen in FIG. 7A, the $C_x$ signal is noisy.

Note, however, that during the interval from t=252 seconds to t=685 seconds the salt stream's level of variation is dramatically reduced. This is because it is during this interval that the control algorithm was switched from the conventional method to the new method (Eqs. (17), (22) and (28), with $1/\delta=0.4, N=60$). Comparison of FIGS. 7A and 7B shows that switching to the new control technique gives an improvement in control quality (the offset from set point is eliminated), while at the same time provides a dramatic reduction in salt flow variability.

EXAMPLE 3

This example compares the set point tracking abilities of the two different halide concentration control methods. Two similar set point tracking experiments are presented, one with conventional concentration control, and the other with the new concentration control method.

Figure 8A:
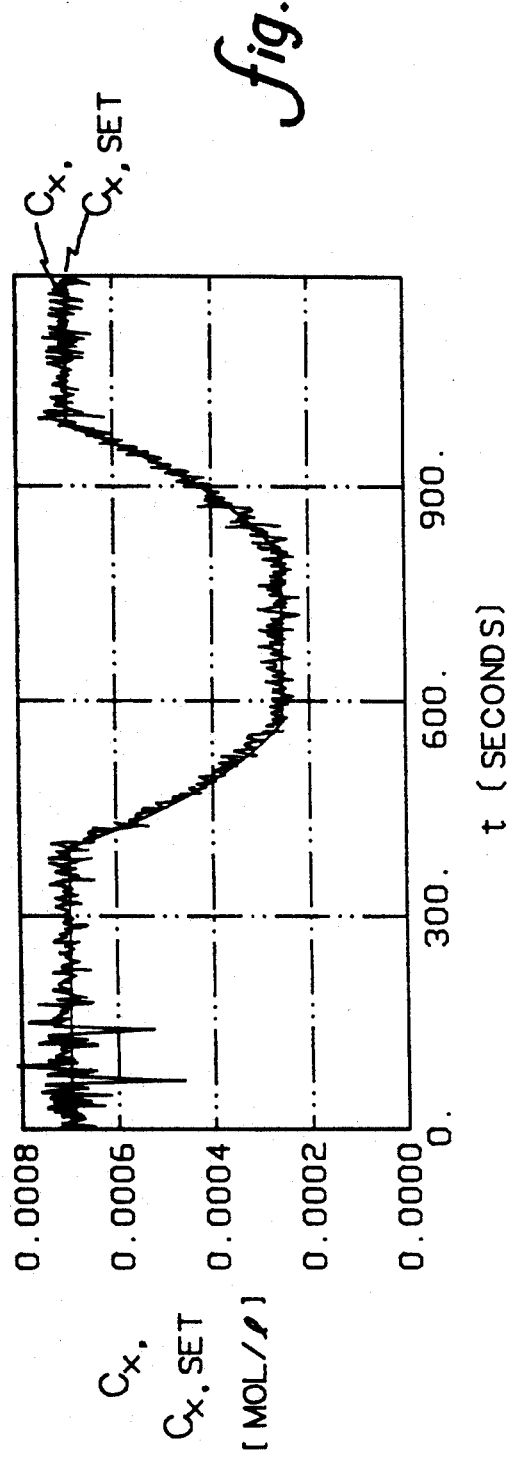
FIGS. 8a and 8b graphically depict a third example of reactant concentration control pursuant to a conventional control algorithm.
Figure 8B:
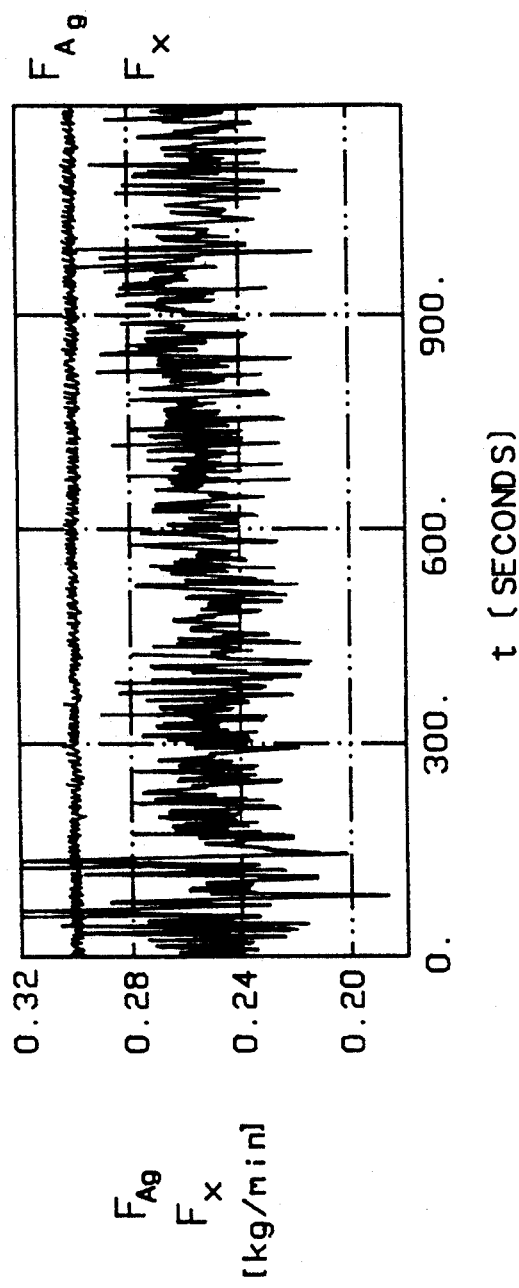

FIGS. 8A and 8B present the experiment using the conventional control algorithm. In FIG. 8A, the observed reactor halide concentration is shown for a set point trajectory that begins by holding $C_{x,set}$ at 0.7 millimoles per liter, then lowering it along a programmed trajectory to 0.248 millimoles per liter, holding there and then increasing along another programmed trajectory back to 0.7 millimoles per liter. This is done while holding the silver nitrate feed flow rate constant at 0.3 kg/min. FIG. 8A shows that the observed reactor halide concentration, although noisy, does follow the desired set point profile well.

In FIG. 8B the measured flow rates for the salt and silver feed streams are shown for the duration of the experiment. Note the relative smoothness of the flow rate for the silver feed compared to the salt feed flow rate. This is because the silver flow rate set point is held at a constant 0.3 kg/min, while the salt feed flow rate is recomputed and changed once every second by the process computer in response to measured changes in the $C_x$ signal and, as is readily seen in FIG. 8A, the $C_x$ signal is noisy.

In FIGS. 9A and 9B the results for a similar experiment, but using the new processing technique of the present invention, are presented. In FIG. 9A, a similar set point trajectory to that of FIG. 8A is shown. Once again, the observed reactor halide concentration, while rather noisy, does follow the desired set point profile well.

In FIG. 9B the measured flow rates for the salt and silver feed streams are shown for the duration of the experiment. In comparing FIG. 9B to FIG. 8B, it will be observed that in FIG. 9B the salt feed flow rate is almost as smooth as the silver flow rate, even though it is the salt flow rate that is being used to control the reactor halide concentration. This is because in FIG. 9B, the new method (Eqs. (17), (22) and (28), with $1/\delta t=0.4, N=60$) is being used to compute the salt flow set points at each time sample, instead of the conventional method.

Figure 10A:
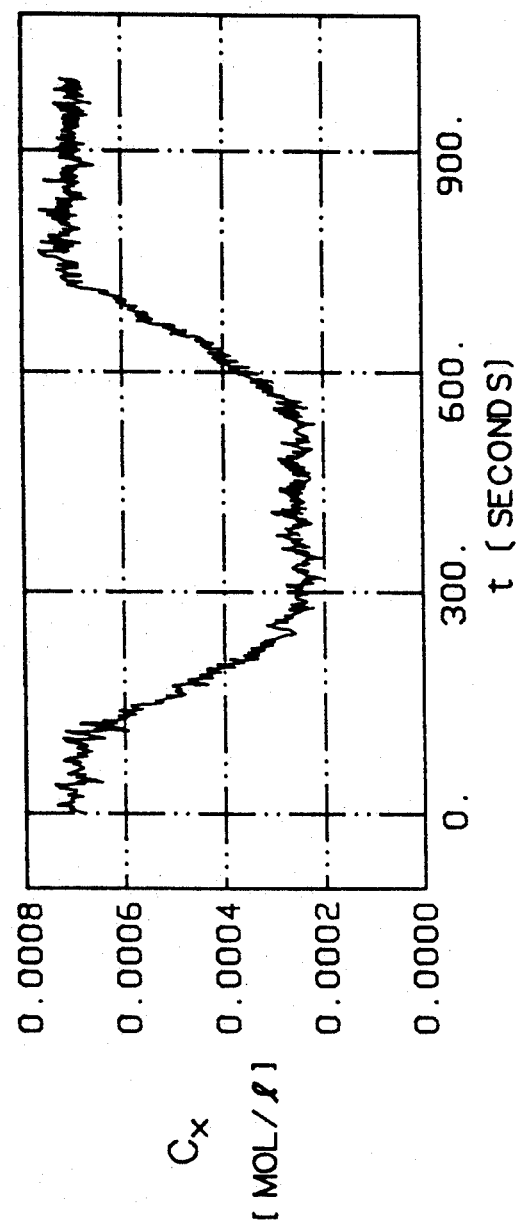
FIGS. 10a and 10b graphically depict the difference in fluctuation between an observed reactor halide concentration measurement and an estimated smoothed halide concentration value computed pursuant to the present invention.
Figure 10B:
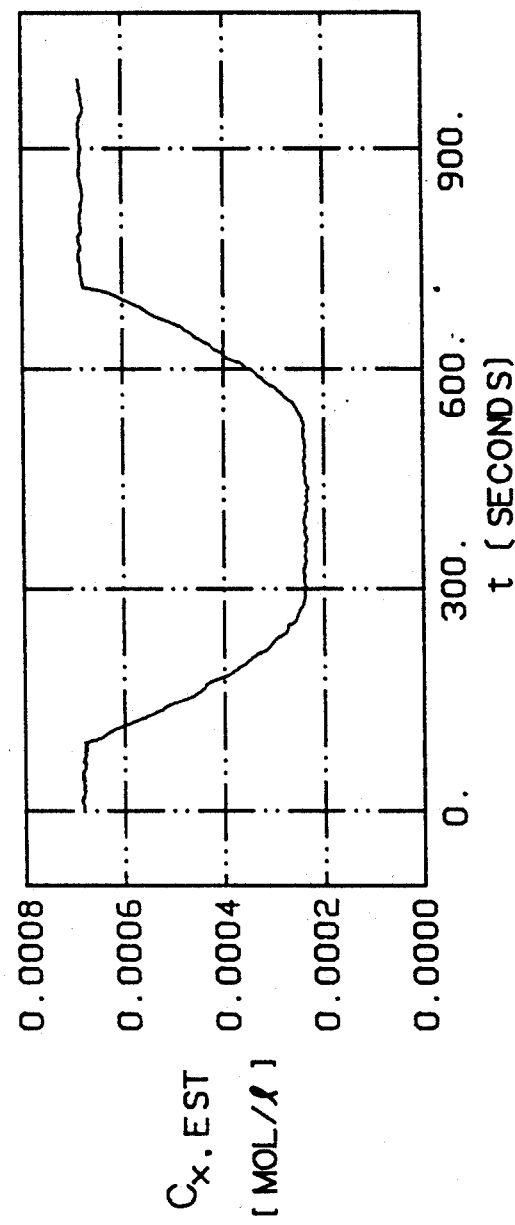

The difference between the raw reactor halide concentration measurement, $C_x$ (FIG. 10A), and the new technique's estimated smoothed reactor halide concentration, $C_{x,Est}$ (FIG. 10B) over the same period is shown in FIGS. 10A and 10B. There are two important things to note here. First, the estimated smoothed concentration is much quieter than the raw observations. Second, there is no lag in the response of the estimated smoothed concentration. In other words, $C_{x,Est}$ tracks the reactor's behavior without delay. Because of these properties, the estimated smoothed concentration is clearly a better signal to use for control purposes.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. In a precipitation reaction, a method for controlling the concentration of one reactant in the precipitation vessel, said vessel being fed by a first reactant feed stream and a second reactant feed stream, said method comprising the steps of:
   (a) measuring the concentration of first reactant in the precipitation vessel;
   (b) measuring the flow rate of the first reactant feed stream and the flow rate of the second reactant feed stream;
   (c) storing the measured first reactant concentration value and the measured flow rates of the first and second reactant feed streams;
   (d) computing an estimated smoothed concentration value for one of said first and second reactants within the precipitation reactor as a function of the stored measured first reactant concentration, first reactant feed stream flow rate, and second reactant feed stream flow rate; and
   (e) adjustably controlling the amount of one of said first and second reactants added to the precipitation vessel as a function of the smoothed value of said reactant concentration computed in step (d).

2. The control method of claim 1, further comprising:
   (f) repeating steps (a)-(e) for each of a plurality of periodically timed measurement cycles.

3. The control method of claim 2, wherein said computing step (d) determines the estimated reactant concentration value as a function of N stored measured first reactant concentrations, first reactant feed stream flow rates, and second reactant feed stream flow rates.

4. The control method of claim 3, wherein said computing step (d) determines the estimated reactant concentration value within the precipitation reactor using the N most recent measured excess first reactant concentrations, first reactant feed stream flow rates, and second reactant feed stream flow rates.

5. The control method of claim 4, wherein said estimated reactant concentration value comprises an estimated first reactant concentration value.

6. The control method of claim 5, wherein the first reactant comprises halide ion and the second reactant comprises silver ion, and the precipitation reaction produces silver halide.

7. The control method of claim 5, wherein the first reactant comprises silver ion and the second reactant comprises halide ion, and the precipitation reaction produces silver halide.

8. The control method of claim 5, wherein said computing step (d) includes:
   (i) using said N measured first feed stream flow rates, second feed stream flow rates and measured first reactant concentrations to determine the error, from a nominal value, of the concentration of the second reactant feed stream; and (ii) computing the estimated smoothed value of the first reactant concentration within the precipitation reactor using the second reactant error signal and the stored N measured first reactant concentrations, first feed stream flow rates, and second feed stream flow rates.

9. In a precipitation reactor having a first feed stream containing a first reactant, $B^-$, and a second feed stream containing a second reactant, $C^+$, said first and second reactants precipitating in said reactor in a batch process having the form: $A^+ + B^- + C^+ + D^- \rightarrow C\text{-}B + A^+ + D^-$, a method for controlling the flow rate of the first feed stream to optimize the first reactant reactor concentration and thereby th precipitation reaction occurring therein, said method comprising the steps of:

(a) measuring the flow rates of the first reactant feed stream and the second reactant feed stream;
(b) measuring the first reactant concentration within the precipitation reactor;
(c) storing the measured first and second feed stream flow rates and the measured first reactant reactor concentration;
(d) repeating steps (a), (b) & (c) for each of N periodically timed measurement samples;
(e) computing an estimated smoothed value for the first reactant reactor concentration as a function of the N stored measured first reactant concentrations, first reactant feed flow rates, and second reactant feed flow rates; and
(f) controlling the flow rate of the first reactant feed as a function of said estimated value of first reactant concentration to optimize the concentration of first reactant within the reactor and thereby the precipitation reaction occurring therein.

10. The control method of claim 9, wherein said computing step (e) includes:

(i) using said N measured first reactant feed stream rates, second reactant feed stream rates and measured first reactant concentrations to determine the error, from a nominal value, of the second reactant feed stream concentration; and
(ii) computing the estimated smoothed value of the first reactant concentration within the precipitation reactor using the second reactant error signal and the stored N measured first reactant concentrations, first reactant feed stream rates, and second reactant feed stream rates.

11. The control method of claim 10, wherein said computing step (e) includes determining said error in second reactant feed concentration by the formula:

$$\delta C_{2R} = [A^T A]^{-1} A^T B$$

wherein: $\delta C_{2R}$ = the error in excess second reactant feed stream concentration from nominal value $$A = \begin{bmatrix} a_1 \\ a_2 \\ a_3 \\ \vdots \end{bmatrix} \text{ wherein: } a_j = \Delta t \sum_{i=1}^{j} F_{2R,i}$$

$\Delta t$ = sample time interval of interest $F_{2R,i}$ = flow rate of second reactant feed stream at sample time i T = matrix transpose $$B = \begin{bmatrix} b_1 \\ b_2 \\ b_3 \\ \vdots \end{bmatrix} \text{ wherein: } b_j = \text{Ideal } B^-\text{Excess}_j - (C_{1R,j})(\text{Vol}_j)$$

wherein:

$b_j$ = Ideal $B^-$ Excess$_j$ − $(C_{1R,j})(\text{Vol}_j)$

Ideal—$B^-$—Excess$_j$ = number of moles of free first reactant expected in the reactor at the jth time interval if the feed concentration of the second reactant was exactly correct (i.e., $\delta C_{2R} = 0$)

$C_{1R,j}$ = first reactant reactor concentration at the jth time interval

Vol$_j$ = reactor liquid volume at the jth time interval.

12. The control method of claim 11, wherein said estimated smoothed value computing step (e) includes calculating the estimated value of the first reactant concentration according to the formula:

$$\begin{bmatrix} \vdots \\ C_{1R,j,Est} \\ \vdots \end{bmatrix} = \begin{bmatrix} \vdots \\ f_j \\ \vdots \end{bmatrix} - \delta C_{2R} \begin{bmatrix} \vdots \\ g_j \\ \vdots \end{bmatrix}$$

wherein:

$C_{1R,j,Est}$ = smoothed value of first reactant concentration at the jth time interval $$f_j = \frac{\text{Ideal } B^-\text{Excess}_j}{\text{vol}_j}$$

$$g_j = \frac{\left(\sum_{i=1}^{j} F_{2R,i} \Delta t\right)}{\text{vol}_j}$$

13. The control method of claim 9, wherein the first reactant comprises halide ion and the second reactant comprises silver ion and wherein the precipitation reaction produces silver halide.

14. The control method of claim 9, wherein multiple first feed streams containing the first reactant are fed to the precipitation reactor and multiple second feed streams containing the second reactant are fed to the precipitation reactor.

15. A method for controlling halide ion reactor concentration during the precipitation of a silver halide in a precipitation reactor fed by a halide feed stream and a silver feed stream, said method comprising the steps of:

(a) measuring the concentration of halide ion in the precipitation reactor;
(b) measuring the flow rate of the halide feed stream and the flow rate of the silver feed stream;
(c) storing the measured halide concentration value and the measured halide and silver feed stream flow rates;

(d) repeating steps (a), (b) and (c) for each of N periodically timed measurement cycles;

(e) computing an estimated smoothed value for halide ion concentration within the precipitation reactor as a function of the N stored measured halide ion concentrations, halide feed stream flow rates, and silver feed stream flow rates; and (f) adjustably controlling the amount of halide ion added to the precipitation reactor as a function of the computed smoothed value of halide ion concentration within the reactor.

16. The control method of claim 15, wherein said steps (e) and (f) are repeated for each measurement cycle, said estimated halide ion concentration being computed in step (e) as a function of the N most recent measured halide ion concentrations, halide feed stream flow rates, and silver feed stream flow rates.

17. The control method of claim 15, wherein multiple halide feed streams and multiple silver feed streams supply halide ion and silver ion, respectively, to the precipitation reactor, and wherein the halide ion concentration within the reactor is controlled by adjustably controlling the flow rate of one of said halide feed streams.

18. The control method of claim 15 wherein said computing step (e) includes determining the error in silver ion feed stream concentration from a nominal concentration value.

19. The control method of claim 18, wherein said error in silver ion feed stream concentration is determined by the formula:

$$\delta C_{Ag} = [A^T A]^{-1} A^T B$$

wherein:

$\delta C_{Ag}$ = the error in silver ion feed stream concentration from nominal value $$A = \begin{bmatrix} a_1 \\ a_2 \\ a_3 \\ \cdot \\ \cdot \end{bmatrix} \text{wherein: } a_j = \Delta t \sum_{i=1}^{j} F_{Ag,i}$$

$\Delta t$ = time interval of interest
$F_{Ag,i}$ = flow rate of silver ion feed stream at sample time i
T = matrix transpose $$B = \begin{bmatrix} b_1 \\ b_2 \\ b_3 \\ \cdot \\ \cdot \end{bmatrix}$$

wherein:
$b_j$ = Ideal—Halide—Excess$_j$ − ($C_{x,j}$)(Vol$_j$)
Ideal—Halide—Excess$_j$ = number of moles of free halide ion expected in the reactor at the jth time interval if the feed concentration of the silver ion was exactly correct (i.e., $\delta C_{Ag}=0$).
$C_{x,j}$ = reactor concentration of halide ion at the jth time interval
Vol$_j$ = vessel liquid volume at the jth time interval.

20. In a precipitation reactor having a first feed stream containing a first reactant, $B^-$, and a second feed stream containing a second reactant, $C^+$, said first and second reactants precipitating in said reactor in a batch process having the form: $A^+ + B^- + C^+ + D^- \rightarrow C\text{-}B + A^+ + D^-$, a method for controlling the flow rate of the first feed stream to optimize the first reactant reactor concentration and thereby the precipitation reaction occurring therein, said method comprising the steps of:

(a) measuring the flow rates of the first reactant feed stream and the second reactant feed stream;

(b) measuring the first reactant concentration within the precipitation reactor;

(c) storing the measured first and second feed stream flow rates and the measured first reactant reactor concentration;

(d) repeating steps (a), (b) and (c) for each of N periodically timed measurement samples;

(e) computing an estimated smoothed value for the first reactant reactor concentration as a function of the N stored measured first reactant concentrations, first reactant feed flow rates, and second reactant feed flow rates; and (f) controlling the flow rate of the first reactant feed by computing a first reactant feed stream flow rate control signal using an adjustable control law of the form:

$$F_{1R} = F_{2R} \frac{((C_{2R,F} + \delta C_{2R}) + C_{1R,Set})}{(C_{1R,F} - C_{1R,Set})} + \frac{\text{vol}(t)(C_{1R,Set} - C_{1R,Est}(t))}{\delta t (C_{1R,F} - C_{1R,Set})}$$

wherein:
$F_{1R}$ = optimal flow rate of first reactant feed stream
$F_{2R}$ = flow rate of second reactant feed stream
$C_{2R,F}$ = concentration of second reactant feed stream
$C_{1R,F}$ = concentration of first reactant feed stream
$\delta C_{2R}$ = error in second reactant feed stream concentration from nominal value
$C_{1R,Set}$ = set point concentration for first reactant
$C_{1R,Est}(t)$ = estimated smoothed value for said first reactant reactor concentration at time t
vol(t) = reactor liquid volume at time t
$\delta t$ = sample time interval of interest.

21. A method for controlling halide ion reactor concentration during the precipitation of a silver halide in a precipitation reactor fed by a halide feed stream and a silver feed stream, said method comprising the steps of:

(a) measuring the concentration of halide ion in the precipitation reactor;

(b) measuring the flow rate of the halide feed stream and the flow rate of the silver feed stream;

(c) storing the measured halide concentration value and the measured halide and silver feed stream flow rates;

(d) repeating steps (a), (b) and (c) for each of N periodically timed measurement cycles;

(e) computing an estimated smoothed value for halide ion concentration within the precipitation reactor as a function of the N stored measured halide ion concentrations, halide feed stream flow rates, and silver feed stream flow rates; and (f) optimally controlling the flow rate of the halide ion input stream according to the formula:

$$F_x = F_{Ag} \frac{((C_{Ag,F} + \delta C_{Ag}) + C_{x,Set})}{(C_{x,F} - C_{x,Set})} + \frac{\text{vol}(t)(C_{x,Set} - C_{x,Est}(t))}{\delta t(C_{x,F} - C_{x,Set})}$$

wherein:
$F_x$ = flow rate of halide feed stream
$F_{Ag}$ = flow rate of silver feed stream
$C_{Ag,F}$ = concentration of silver feed stream
$\delta C_{Ag}$ = error in silver ion feed stream concentration from nominal value
$C_{x,F}$ = concentration of halide feed stream
$C_{x,Set}$ = set point concentration value for halide
vol(t) = reactor liquid volume at time t
$\delta(t)$ = time sample interval of interest
$C_{x,est}(t)$ = smoothed value of halide reactor concentration at time t.

* * * * *